US012766620B2

(12) United States Patent
Maruyama

(10) Patent No.: US 12,766,620 B2
(45) Date of Patent: Oct. 20, 2026

(54) TOOL, GEAR MACHINING APPARATUS, AND METHOD OF MACHINING GEAR

(71) Applicant: JTEKT GEAR SYSTEMS CORPORATION, Seto (JP)

(72) Inventor: Kenichi Maruyama, Seto (JP)

(73) Assignee: JTEKT GEAR SYSTEMS CORPORATION, Seto (JP)

( * ) Notice: Subject to any disclaimer, the term of this patent is extended or adjusted under 35 U.S.C. 154(b) by 246 days.

(21) Appl. No.: 18/841,786

(22) PCT Filed: Aug. 29, 2023

(86) PCT No.: PCT/JP2023/031141
§ 371 (c)(1),
(2) Date: Aug. 27, 2024

(87) PCT Pub. No.: WO2025/046725
PCT Pub. Date: Mar. 6, 2025

(65) Prior Publication Data
US 2026/0175307 A1 Jun. 25, 2026

(51) Int. Cl.
*B23F 19/10* (2006.01)
*B23F 19/06* (2006.01)
(Continued)

(52) U.S. Cl.
CPC .............. *B23F 19/06* (2013.01); *B23F 19/10* (2013.01); *B23F 19/12* (2013.01); *B23F 21/005* (2013.01);
(Continued)

(58) Field of Classification Search
CPC ...... B23F 21/005; B23F 19/066; B23F 19/10; B23F 21/28; Y10T 407/1902; Y10T 409/101113-101272; Y10T 407/1735
(Continued)

(56) References Cited

U.S. PATENT DOCUMENTS 1,343,276 A * 6/1920 Olson ..................... B23F 21/16 407/26
4,290,718 A * 9/1981 Occhialini .............. B23F 19/10 409/8
4,610,577 A * 9/1986 Spensberger ........... B23F 21/03 407/29
2005/0239385 A1 10/2005 Jankowski et al.
(Continued)

FOREIGN PATENT DOCUMENTS

DE 26 54 177 A1 6/1978
DE 102011050524 A1 * 11/2012
(Continued)

OTHER PUBLICATIONS

Oct. 24, 2023 Search Report issued in International Patent Application No. PCT/JP2023/031141.
Oct. 24, 2023 Written Opinion of the International Searching Authority issued in International Patent Application No. PCT/JP2023/031141.

*Primary Examiner* — Erica E Cadugan
(74) *Attorney, Agent, or Firm* — Oliff PLC

(57) ABSTRACT

A tool includes a first tool member having first machining blades which are formed on an outer circumferential surface of a first tool body and which perform first machining on a workpiece gear and a second tool member having second machining blades which are formed on an outer circumferential surface of a second tool body and which perform second machining on the workpiece gear. The tool is formed such that, in a state in which the first tool member and the second tool member are combined, the first machining blades of the first tool member protrude toward the second tool member and the second machining blades of the second tool member are positioned at predetermined intervals in a circumferential direction relative to protruding portions of the first machining blades.

21 Claims, 16 Drawing Sheets

(51) Int. Cl.

| | |
|---|---|
| ***B23F 19/12*** | (2006.01) |
| ***B23F 21/00*** | (2006.01) |
| ***B23F 21/02*** | (2006.01) |
| ***B23F 21/12*** | (2006.01) |
| ***B23F 21/28*** | (2006.01) |

(52) U.S. Cl.

CPC .............. *B23F 21/02* (2013.01); *B23F 21/12* (2013.01); *B23F 19/066* (2013.01); *B23F 21/28* (2013.01); *Y10T 407/17* (2015.01); *Y10T 407/1735* (2015.01); *Y10T 407/1902* (2015.01); *Y10T 409/101113* (2015.01); *Y10T 409/10795* (2015.01)

(58) Field of Classification Search

USPC ...................................... 407/31, 27; 409/8–9

See application file for complete search history.

(56) References Cited

U.S. PATENT DOCUMENTS

| | | | | |
|---|---|---|---|---|
| 2011/0229282 | A1* | 9/2011 | Ohno ...................... | B23F 19/10 409/8 |
| 2016/0193648 | A1* | 7/2016 | Thijssen ................. | B23F 19/10 29/893.32 |
| 2020/0171591 | A1 | 6/2020 | Weppelmann | |

FOREIGN PATENT DOCUMENTS

| | | | | |
|---|---|---|---|---|
| GB | 698122 | A | * | 10/1953 |
| JP | 61-284318 | A | * | 12/1986 |
| JP | 2009-034785 | A | | 2/2009 |
| JP | 2012-096352 | A | | 5/2012 |
| JP | 2013-056403 | A | | 3/2013 |
| JP | 2018-167369 | A | | 11/2018 |
| JP | 2020-526399 | A | | 8/2020 |

* cited by examiner

TOOL, GEAR MACHINING APPARATUS, AND METHOD OF MACHINING GEAR

TECHNICAL FIELD

The present invention relates to a tool, a gear machining apparatus, and a method of machining a gear.

BACKGROUND ART

A phrasing cutter disclosed in Patent Literature 1 is conventionally known, for instance. The conventional phrasing cutter has chamfering portions and deburring portions formed on an outer circumferential portion of a disk-shaped cutter body. The chamfering portion is formed by arranging one or a plurality of chamfering blades (phrasing blades) for chamfering an end portion of a tooth of a workpiece gear by pressing the end portion. The deburring portion is formed by arranging one or a plurality of deburring blades for cutting and removing burrs generated when the end portion of the tooth of the workpiece gear is pressed by the chamfering blade. In the conventional phrasing cutter, the chamfering portions and the deburring portions are alternately arranged in the circumferential direction along the outer circumferential portion of the cutter body.

CITATION LIST

Patent Literature

Patent Literature 1: Japanese Patent Application Publication No. 2013-56403

SUMMARY OF THE INVENTION

Technical Problem

In the above-indicated conventional phrasing cutter as a tool, the phrasing blade presses an end surface of the tooth of the gear workpiece to perform chamfering, and the deburring blade presses, as a burr, a convex portion generated as a result of the chamfering to level the convex portion. That is, in the conventional phrasing cutter, although respective machining purposes of the phrasing blade and the deburring blade are mutually different, both of them press a machining point in one direction to crush the machining point so as to transfer the planar shape of the blade to the machining point, that is, both of the phrasing blade and the deburring blade perform only rolling.

In some cases, a workpiece is required to be subjected to different types of machining while rotating in mesh with a tool. When the workpiece is a workpiece gear, in addition to the above-indicated chamfering machining, that is, phrasing machining, relief machining is required in which a corner edge of a corner portion is removed while relatively moving a machining point to improve gear rattle of the workpiece gear. Further, when the workpiece is a workpiece gear, shaving machining is required in which irregularities or unevenness (what is called polygon error) generated on a tooth surface of the workpiece gear is removed while relatively moving the machining point to realize smooth meshing.

In these cases, after chamfering and deburring are performed, the conventional phrasing cutter needs to be replaced with a relief cutter when the relief machining is required or needs to be replaced with a shaving cutter when the shaving machining is required. That is, when machining while relatively moving the machining point is required, the conventional phrasing cutter requires a changeover. Thus, a time required for changeover increases with an increase in the number of times of changeover so as to cope with a plurality of machining processes. Therefore, there is room for improvement in terms of enhancing production efficiency when machining is performed on a gear to be machined, which is a workpiece, using a phrasing cutter, which is a conventional tool.

It is an object of the present invention to provide a tool that can improve production efficiency, a gear machining apparatus using the tool, and a method of machining a gear using the tool.

Solution to Problem

A tool according to the present invention having a plurality of machining blades includes: first machining blades formed on an outer circumferential surface of a disk-shaped tool body so as to be parallel to a rotation axis of the tool body, the first machining blades performing first machining on a workpiece; and second machining blades which are formed on the outer circumferential surface so as to be twisted with respect to the rotation axis and which have a blade length along a direction of the rotation axis longer than that of the first machining blades such that a machining point with respect to the workpiece is movable, the second machining blades performing second machining on the workpiece, wherein the first machining blades and the second machining blades are alternately arranged along the outer circumferential surface.

In this case, the tool may be formed as follows, for instance. The tool body is constituted by a first tool body having a disk shape and a second tool body having a disk shape, wherein the tool includes: a first tool member having the first machining blades formed on an outer circumferential surface of the first tool body to perform the first machining on the workpiece; and a second tool member having the second machining blades formed on an outer circumferential surface of the second tool body to perform the second machining on the workpiece, and wherein, in a state in which the first tool member and the second tool member are combined such that respective rotation axes of the first tool body and the second tool body are coaxial with each other, the machining blades of one of the first tool member and the second tool member are formed so as to protrude toward the other of the first tool member and the second tool member and the machining blades of the other of the first tool member and the second tool member are positioned at predetermined intervals in a circumferential direction relative to protruding portions of the machining blades of the one of the first tool member and the second tool member.

A gear machining apparatus of the present invention includes: the tool formed as described above; a tool spindle configured to rotationally drive the tool; a workpiece spindle configured to rotationally drive a workpiece gear as the workpiece; and a moving device configured to move the workpiece spindle and the tool spindle relative to each other so as to enable the tool supported by the tool spindle and the workpiece gear supported by the workpiece spindle to be in mesh with each other, wherein the first machining and the second machining are repeatedly performed in one machining step.

A method of machining a gear according to the present invention uses: the tool formed as described above; a tool spindle configured to rotationally drive the tool; a workpiece spindle configured to rotationally drive a workpiece gear as the workpiece; and a moving device configured to move the workpiece spindle and the tool spindle relative to each other so as to enable the tool supported by the tool spindle and the workpiece gear supported by the workpiece spindle to be in mesh with each other, wherein the method comprises continuously and repeatedly performing, in one machining step, the first machining and the second machining in order by performing the second machining following the first machining and performing the first machining following the second machining.

Advantageous Effects

According to the present invention, the tool include the first machining blades for performing the first machining and the second machining blades for performing the second machining in which the machining point is moved unlike the first machining. The tool continuously and repeatedly performs the first machining and the second machining on the workpiece. Accordingly, a time for changeover or the like is not necessary in a case where the tool according to the present invention is used, as compared with a case where the first machining and the second machining are separately performed on the workpiece, that is, a case where only the first machining is performed and then only the second machining is performed. Thus, the machining time is reduced when the tool according to the present invention is used. This enhances production efficiency for producing the workpiece.

DESCRIPTION OF EMBODIMENT (1) Configuration of Gear Machining Apparatus 1

There will be described a configuration of a gear machining apparatus 1 with reference to FIG. 1. The gear machining apparatus 1 is a machine tool that performs predetermined machining such as rolling, cutting, or grinding on a workpiece. In the present embodiment, there is exemplified, as a workpiece to be machined by the gear machining apparatus 1, a workpiece gear W in which workpiece teeth W1 are formed through a gear cutting step (not described) using gear cutting such as a hob or a gear shaper. Hereinafter, the workpiece gear W will be referred to as a "gear workpiece W" where appropriate.

As for the gear workpiece W, helical teeth may be formed through the gear cutting step or spur teeth may be formed through the gear cutting step. In the present embodiment, there will be described a case where the workpiece teeth W1 are helical teeth as one example.

The gear machining apparatus 1 performs rolling, cutting, or grinding while rotating the gear workpiece W and a tool 10 described later in a state in which the gear workpiece W and the tool 10 are in mesh with each other. Thus, there are exemplified, as the gear machining apparatus 1, a machining center, a lathe, a grinding machine, etc., having a plurality of processing axes for changing a relative position and posture between the gear workpiece W and the tool 10.

Figure 1:
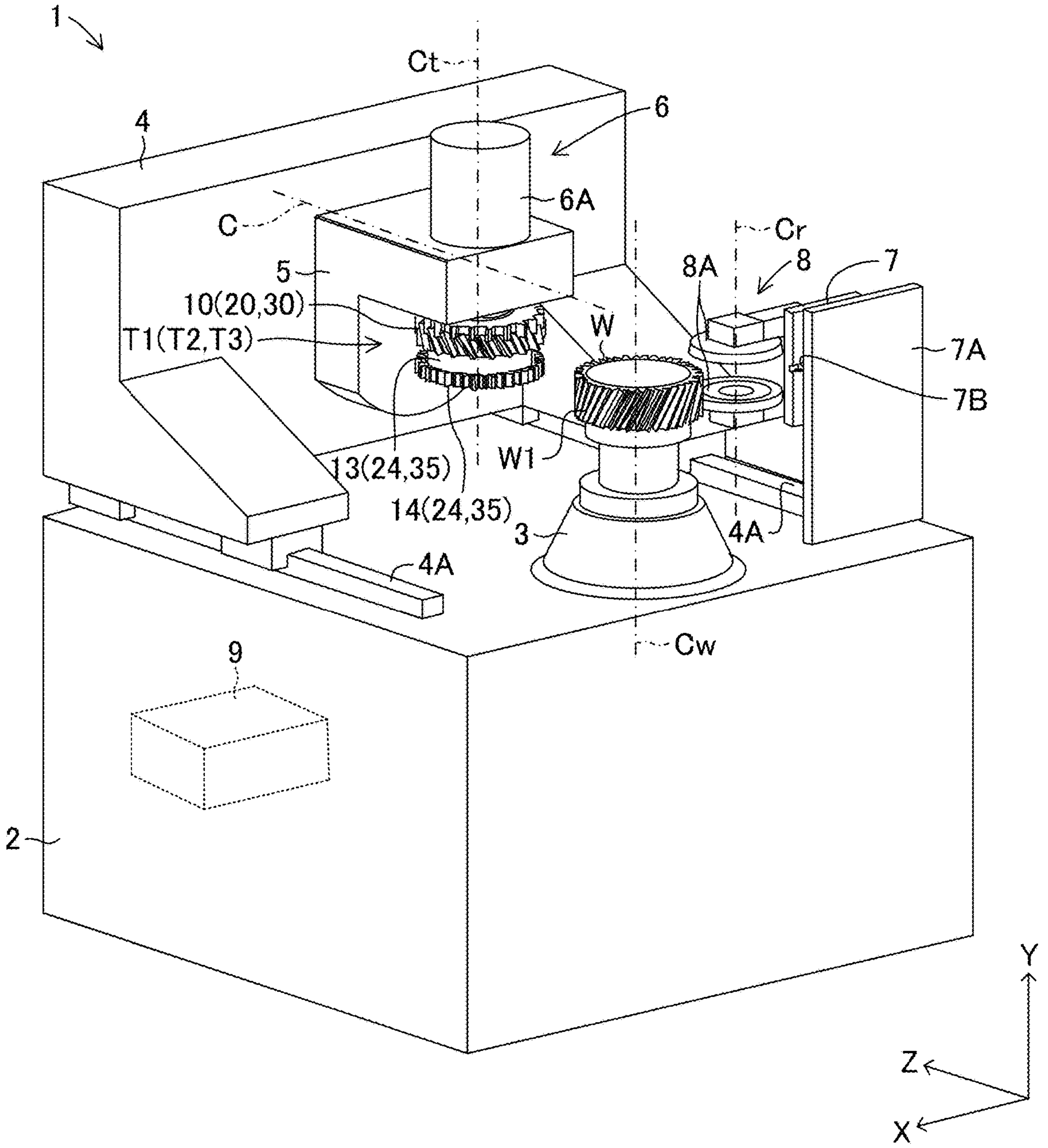
FIG. 1 is a schematic view illustrating configurations of a tool and a gear machining apparatus according to one embodiment.

As illustrated in FIG. 1, the gear machining apparatus 1 mainly includes a base 2, a workpiece spindle 3, a Z-axis moving table 4, a turning table 5, a tool spindle 6, an X-axis moving table 7, a deburring roller 8, and a control device 9. The gear machining apparatus 1 includes a tool unit T1 attached to the tool spindle 6 and including the tool 10.

Here, the gear machining apparatus 1 has, for example, an X axis, a Y axis, and a Z axis orthogonal to each other. A direction of a rotation axis Cw of the gear workpiece W (rotation axis Cw of the workpiece spindle 3) is defined as a Y-axis direction, and two axes orthogonal to the Y-axis direction are defined as an X-axis direction and a Z-axis direction. In the gear machining apparatus 1, a horizontal direction is the X-axis direction, a vertical direction is the Y-axis direction, and a depth direction is the Z-axis direction, as illustrated in FIG. 1.

The gear machining apparatus 1 also has a rotation axis Ct (rotation axis Ct of the tool spindle 6) that is along the Y-axis direction for rotationally driving the tool 10. The gear machining apparatus 1 further has a rotation axis Cr that is along the Y-axis direction for supporting the deburring roller 8 in a freely rotatable manner. Further, in the gear machining apparatus 1, the tool spindle 6 has a C-axis (rotation axis extending in the Z axis in a reference state shown in FIG. 1) for changing the relative posture between the gear workpiece W and the tool 10, as described later in detail.

The base 2 is fixed on an installation surface. The base 2 is formed in a suitable shape such as a substantially rectangular shape.

The workpiece spindle 3 is disposed substantially at the center in the X-axis direction and on the front side in the Z-axis direction on the upper surface of the base 2. The workpiece spindle 3 supports the gear workpiece W so as to be freely rotatable about the Y axis, that is, the rotation axis Cw. As a result, the gear workpiece W supported by the workpiece spindle 3 rotates together with the tool 10 (tool unit T1) held by the tool spindle 6 when the tool 10 is rotationally driven in a state in which the gear workpiece W is in mesh with the tool 10, as described later.

The Z-axis moving table 4 as a moving device is provided so as to be movable in the Z-axis direction with respect to the base 2. Specifically, a pair of Z-axis guide rails 4A extending in the Z-axis direction are provided on the upper surface of the base 2. The Z-axis moving table 4 is driven by a linear motor, a ball screw mechanism, or the like (not illustrated). Accordingly, the Z-axis moving table 4 reciprocates in the Z-axis direction, that is, with respect to the gear workpiece W and the workpiece spindle 3 while being guided by the pair of Z-axis guide rails 4A.

The turning table 5 as a moving device is disposed on a side surface of the Z-axis moving table 4 facing the gear workpiece W. The turning table 5 reciprocates in the Z-axis direction integrally with the Z-axis moving table 4. The turning table 5 is provided so as to be rotatable about the C-axis with respect to the Z-axis moving table 4. The turning table 5 is driven by a rotary motor (not illustrated) so as to be rotatable about the C-axis.

In the reference state of FIG. 1, the tool spindle 6 is disposed parallel to the Y-axis direction. The tool spindle 6 is rotatably supported by the turning table 5 and moves in the Z-axis direction integrally with the turning table 5 and the Z-axis moving table 4, that is, moves relative to the workpiece spindle 3. The tool spindle 6 is rotationally driven by a spindle motor 6A provided on the turning table 5. The tool spindle 6 supports a tool unit T1 including the tool 10. The tool spindle 6 has a tool holder (not illustrated), and the tool unit T1 is attached to the tip of the tool spindle 6 by being held by the tool holder. Thus, the tool 10 rotates when the tool spindle 6 is rotationally driven by the spindle motor 6A.

The X-axis moving table 7 is provided so as to be movable in the X-axis direction with respect to the base 2. Specifically, on the upper surface of the base 2, a support portion 7A is erected on the X-axis direction side (on the right side of the workpiece spindle 3 in FIG. 1) and on the front side in the Z-axis direction, and an X-axis guide rail 7B extending in the X-axis direction is provided on the support portion 7. The X-axis moving table 7 is driven by a linear motor, a ball screw mechanism, or the like (not illustrated). Thus, the X-axis moving table 7 reciprocates in the X-axis direction, that is, with respect to the gear workpiece W, while being guided by the X-axis guide rails 7B.

The deburring roller 8 removes burrs generated on the gear workpiece W during machining. The deburring roller 8 is installed on the X-axis moving table 7 and reciprocates in the X-axis direction integrally with the X-axis moving table 7. The deburring roller 8 includes a pair of rollers 8A. In the present embodiment, the pair of rollers 8A are driven by a drive mechanism (not illustrated) to approach or separate from each other along the direction of the rotation axis Cr, that is, the Y-axis direction.

Accordingly, the deburring roller 8 approaches the gear workpiece W by moving integrally with the X-axis moving table 7. The deburring roller 8 removes burrs (bulges) generated on the side surfaces of the gear workpiece W by the pair of rollers 8A sandwiching the side surfaces of the gear workpiece W in the rotation axis Cw direction. The deburring roller 8 is rotated together with the gear workpiece W by the rotation of the gear workpiece W, that is, by the rotational driving of the tool 10, in a state in which the gear workpiece W is sandwiched between the pair of rollers 8A.

The control device 9 controls the operation of the gear machining apparatus 1 based on an NC program generated based on operation command data such as the shape of the workpiece teeth W1 of the gear workpiece W, machining conditions, and the shape of the tool 10 (tool unit T1). That is, the control device 9 generates the NC program based on the input operation command data. Then, the control device 9 controls the motors including the spindle motor 6A based on the generated NC program to machine the workpiece teeth W1 of the gear workpiece W (workpiece gear W). Here, the operation command data includes, for example, a command cutting speed, a command position, a command rotation speed of the tool 10, a command pressing force with which the tool 10 presses the gear workpiece W.

Figure 2:
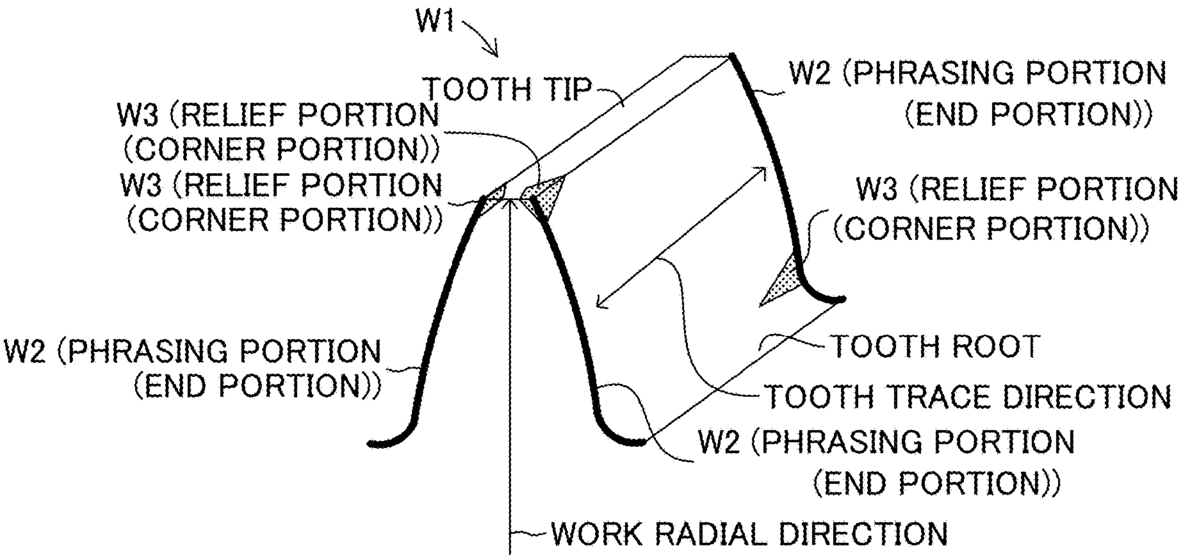
FIG. 2 is a view for explaining portions of a gear to be machined which is a workpiece, i.e., workpiece gear.

In the following description, the radial direction of the gear workpiece W is referred to as a "workpiece radial direction" as illustrated in FIG. 2. In the following description, a "tooth trace direction" corresponds to a direction of extension of one workpiece tooth W1 extending from one end to the other end in the direction of the rotation axis Cw of the gear workpiece W. In a case where the gear workpiece W is a helical gear, the tooth trace direction is inclined with respect to the rotation axis Cw of the gear workpiece W. In a case where the gear workpiece W is a spur gear, the tooth trace direction is parallel to the rotation axis Cw of the gear workpiece W. For ease of understanding, FIG. 2 illustrates the case where the gear workpiece W is a spur gear.

In the following description, an "end portion W2" and a "phrasing portion W2" correspond to one and the other end portions in the tooth trace direction as indicated by thick lines in FIG. 2. In this case, when the "end portion W2" is chamfered by phrasing machining, the "phrasing portion W2" is formed at the "end portion W2".

Further, in the following description, a "corner portion W3" and a "relief portion W3" correspond to one corner portion among four corner portions in the tooth trace direction. That is, the "corner portion W3" is a region present on a tooth tip side or a tooth root side of the workpiece tooth W1 as indicated by dots in FIG. 2. When relief machining is performed on the "corner portion W3" to remove a corner edge, the "relief portion W3" is formed at the "corner portion W3".

Figure 3:
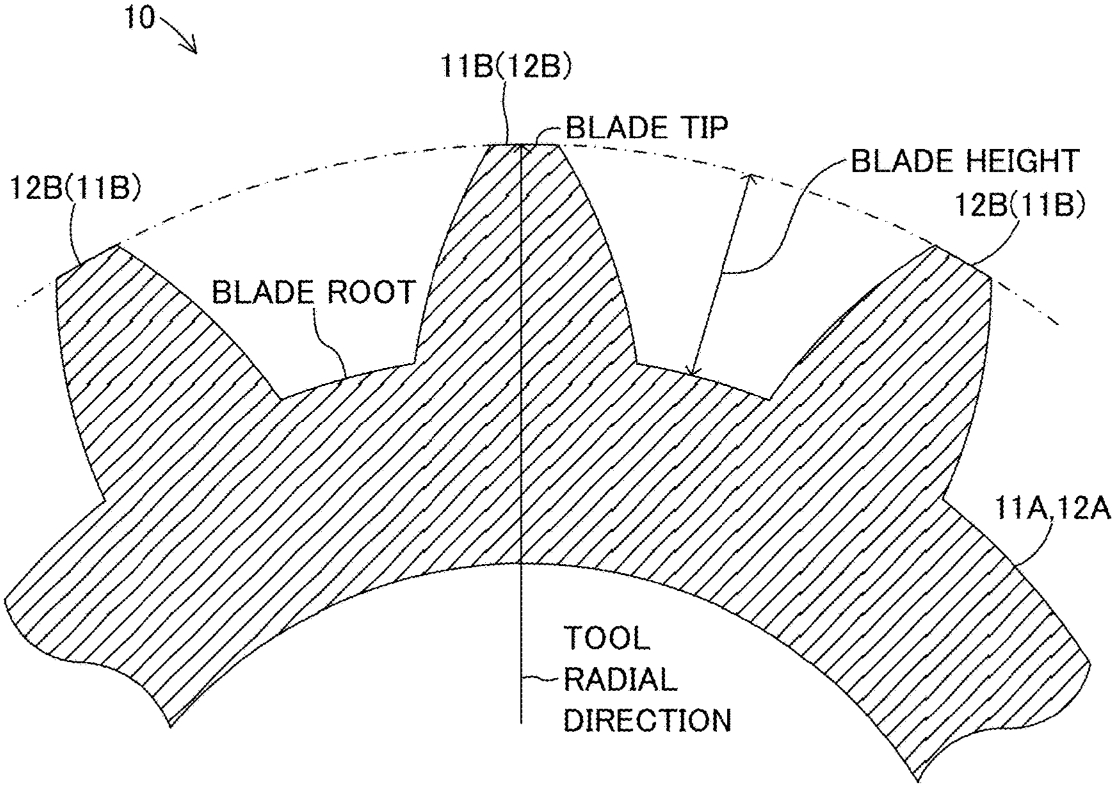
FIG. 3 is a view for explaining the tool.

As illustrated in FIG. 3, in the following description, a "blade height" represents a distance in the radial direction from a blade root to a blade tip for each of a first machining blade 11B and a second machining blade 12B of the tool 10 described later. In the following description, when the tool 10 is exemplified, a "blade length" represents a length of each of the first machining blade 11B and the second machining blade 12B extending from one end to the other end in the direction of the rotation axis Ct of the tool 10.

(2) Configuration of Tool Unit T1

Figure 4:
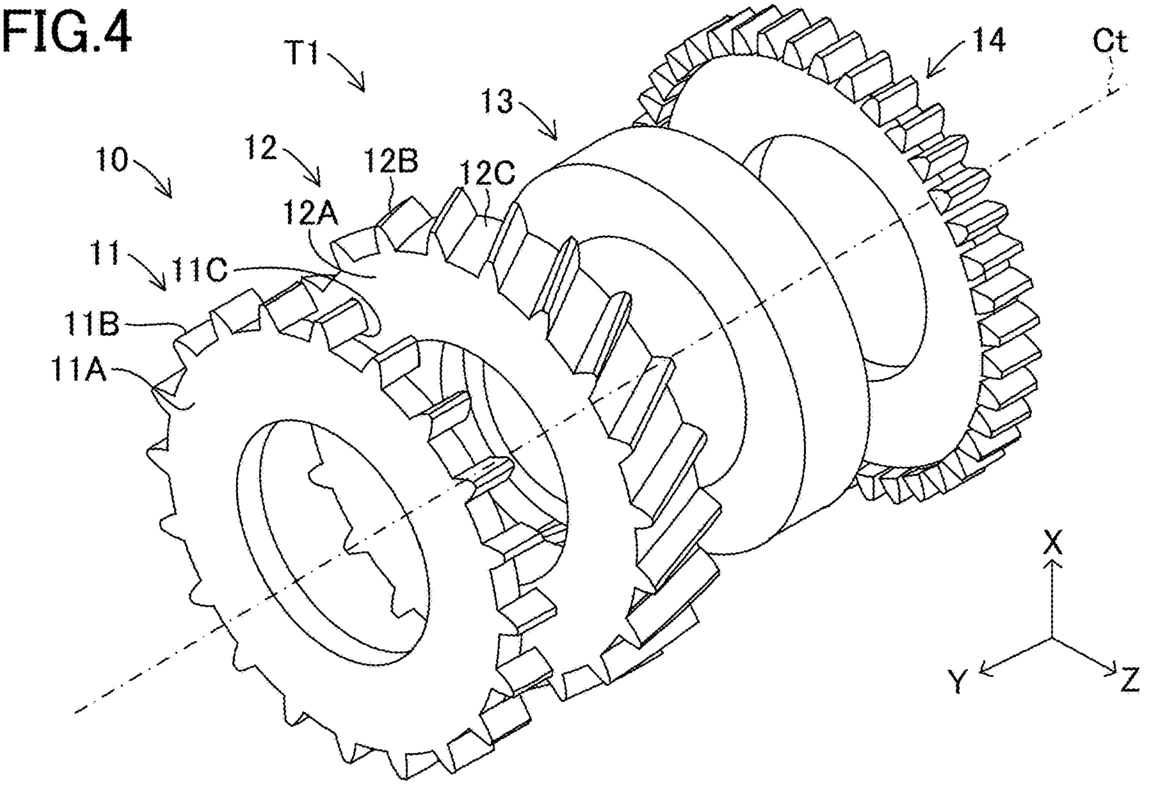
FIG. 4 is a schematic view illustrating the configuration of the tool according to the embodiment.

There will be next described a configuration of the tool unit T1 attached to the tool spindle 6 of the gear machining apparatus 1. As illustrated in FIG. 4, the tool unit T1 of the present embodiment includes the tool 10, a spacer 13, and a phrasing cutter 14. In the tool unit T1, the tool 10 and the phrasing cutter 14 are integrally assembled via the spacer 13 so as to be coaxial with each other such that a space, which corresponds to the tooth width of the gear workpiece W in the tooth trace direction, is interposed between the tool 10 and the phrasing cutter 14. The tool 10 and the phrasing cutter 14 are fixed to the spacer 13 by bolts (not illustrated), for instance.

2-1. Configuration of Tool 10

The tool 10 is a rolling die and includes a first tool member 11 and a second tool member 12. The tool 10 is formed by combining the first tool member 11 and the second tool member 12 with each other. Accordingly, in the tool unit T1, the tool 10 in which the first tool member 11 and the second tool member 12 are combined and the phrasing cutter 14 are fixed to the spacer 13.

The first tool member 11 is a tool member that performs first machining on the workpiece teeth W1 of the gear workpiece W. The first tool member 11 includes a disk-shaped first tool body 11A. The first tool member 11 includes the first machining blades 11B formed on an outer circumferential surface of the first tool body 11A. Here, the "first machining" in the present embodiment is phrasing machining (chamfering machining) for chamfering the end portion W2 of the workpiece tooth W1. Thus, the first machining blades 11B of the present embodiment are phrasing blades that are formed parallel to the rotation axis Ct of the first tool body 11A so as to perform phrasing machining.

The second tool member 12 is a tool member that performs second machining different from the first machining on the workpiece teeth W1 of the gear workpiece W. The second tool member 12 includes a disk-shaped second tool body 12A different from the first tool body 11A. The second tool member 12 includes the second machining blades 12B formed on an outer peripheral surface of the second tool body 12A. Here, the "second machining" in the present embodiment is relief machining for removing a corner edge of one corner portion W3 among four corners of the workpiece tooth W1. Therefore, the second machining blades 12B of the present embodiment are relief blades that are formed so as to be twisted with respect to the rotation axis Ct of the second tool body 12A (that is, in a helical tooth shape) so as to perform relief machining.

Here, the blade length of each first machining blade 11B parallel to the rotation axis Ct of the tool 10 corresponds to a length obtained by adding a protruding amount of a protruding portion 11C described later to a thickness (distance in the direction of the rotation axis Ct) of the first tool body 11A. Since each second machining blade 12B is twisted with respect to the rotation axis Ct of the tool 10, that is, inclined with respect to the rotation axis Ct, the second machining blade 12B extends along the circumferential direction of the second tool body 12A. The blade length of the second machining blade 12B is longer than that of the first machining blade 11B.

Figure 5:
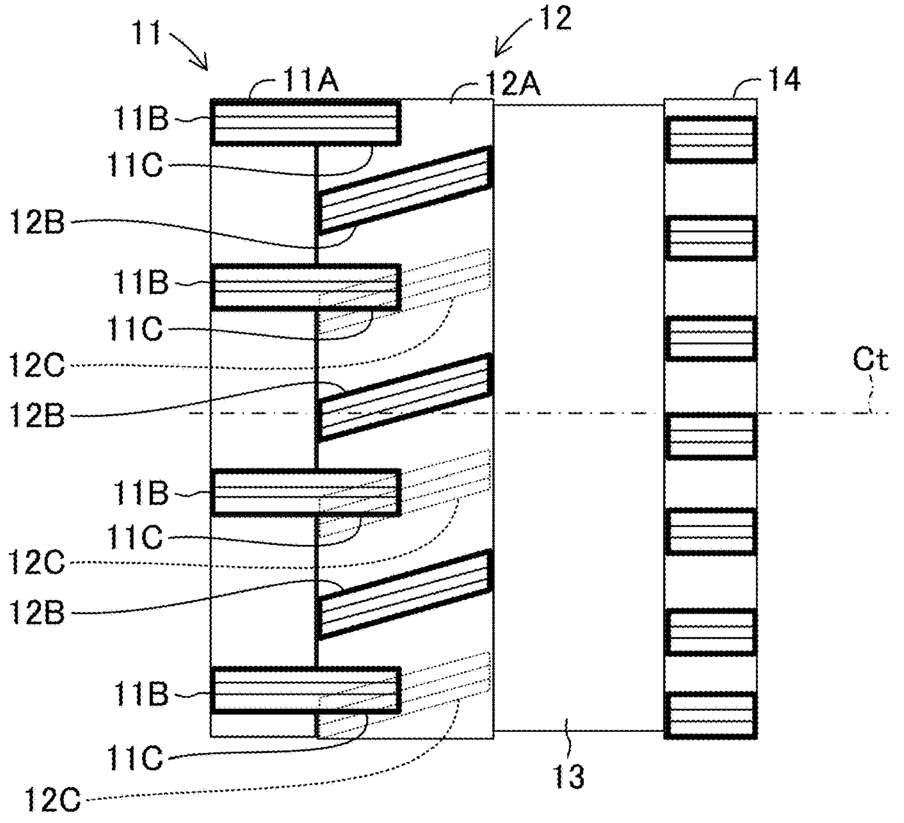
FIG. 5 is a view for explaining the configuration of the tool according to the embodiment.

In the tool 10, the first tool member 11 and the second tool member 12 are combined with each other. Specifically, the first tool member 11 and the second tool member 12 are combined such that respective center axes Ct of the first tool body 11A and the second tool body 12A are coaxial. In this case, the machining blades of one of the first tool member 11 and the second tool member 12, in the present embodiment, the first machining blades 11B have the respective protruding portions 11C protruding toward the second tool member 12 which is the other of the first tool member 11 and the second tool member 12, as illustrated in FIGS. 4 and 5. In the second tool member 12, the second machining blades 12B are formed so as to be positioned at predetermined intervals in the circumferential direction relative to the protruding portions 11C of first machining blades 11B of the first tool member 11.

More specifically, a formation pitch of the machining blades of the phrasing cutter 14 is identical with a formation pitch of the formed workpiece teeth W1 of the gear workpiece W. When the formation pitch of the phrasing cutter 14 is used as a reference, the formation pitch of the first machining blades 11B and the formation pitch of the second machining blades 12B are larger than the formation pitch of the phrasing cutter 14 if the formation pitches of the first machining blades 11B and the second machining blades 12B are the same.

That is, in the second tool member 12, as illustrated in FIG. 5, the second machining blades 12B should be formed at the same formation pitch as that of the phrasing cutter 14. In the present embodiment, however, the second tool member 12 has removed portions 12C indicated by a broken line in FIG. 5 by removing part of the second machining blades 12B. Accordingly, when the first tool member 11 and the second tool member 12 are combined, the protruding portions 11C of the first machining blades 11B respectively enter the removed portions 12C of the second tool member 12, in other words, each protruding portion 11C enters between corresponding two of the second machining blades 12B adjacent to each other in the circumferential direction. Therefore, in the present embodiment, the first machining blades 11B and the second machining blades 12B are arranged at predetermined intervals in the circumferential direction.

(3) Gear Machining Method

There will be next described a gear machining method in which phrasing machining and relief machining are performed on a gear workpiece W (workpiece gear W) before heat treatment in a state in which the tool unit T1 including the tool 10 is attached to the gear machining apparatus 1 described above. Because the gear workpiece W is subjected to the phrasing machining and the relief machining before the heat treatment, rough phrasing portions W2 and rough relief portions W3 are formed in advance. Finally, finish grinding or the like is performed on the workpiece teeth W1, whereby the gear workpiece W is produced as a gear that is a final product.

Here, in a case where a force is transmitted by gears, which are products, in a mutually meshing state, there may be a case in which smooth meshing is impaired due to the presence of burrs or protrusions at end portions of the gears when both gears start to mesh with each other. When smooth meshing is impaired, there is a concern that noise may be generated or the teeth may be damaged in accordance with the rotation of the gears.

In the present embodiment, therefore, the first machining blades 11B and the phrasing cutter 14 mesh with both end portions W2 of each workpiece tooth W1 in the tooth trace direction. Then, the blade surfaces of the first machining blades 11B and the phrasing cutter 14 cut the workpiece teeth W1 while rotating by themselves, so that the first machining blades 11B and the phrasing cutter 14 perform rolling, namely, phrasing machining, in which the end portions W2 are pressed and crushed. As a result, the chamfered phrasing portions W2 are formed at the end portions W2 of the workpiece tooth W1, thus attaining smooth meshing of the gears.

Further, in a case where a force is transmitted by gears, which are products, in a mutually meshing state, a phase shift of meshing may occur due to deflection of teeth of the gears when both gears start to mesh with each other. If the phase shift occurs at the beginning of meshing, the teeth of the respective gears largely interfere with each other. As a result, there is generated a high surface pressure at the position of the beginning of meshing, causing a risk of damage of the teeth.

Therefore, in the present embodiment, the second machining blade 12B moves the machining point along the tooth trace direction while rotating by itself in a state of meshing with the workpiece tooth W1. As a result, the second machining blade 12B performs relief machining by pressing a region of the tooth surface of the workpiece tooth W1 where a high surface pressure is generated at the start of meshing, specifically, one corner portion W3 of the four corners of the tooth surface. Then, the corner edge of the corner portion W3 of the tooth surface is removed to form the relief portion W3. That is, the thickness of the portion of the workpiece tooth W1 where the relief portion W3 is formed is reduced, thereby preventing a high surface pressure from being generated.

Specifically, as the gear machining method of the present embodiment, the control device 9 executes a gear machining process of sequentially and continuously repeating the first machining and the second machining in step S11. Then, in step S12, the control device 9 determines whether or not the gear machining process has been executed until the machining time of the gear machining process reaches a predetermined time. When the gear machining process has been executed until the predetermined time elapses, the control device 9 ends the gear machining step in step S13.

As described above, in the tool 10, the first tool member 11 that performs the phrasing machining and the second tool member 12 that performs the relief machining are combined. That is, in the tool 10, the first tool member 11 and the second tool member 12 are combined with each other, so that the phrasing blades as the first machining blades 11B having a spur tooth shape and the relief blades as the second machining blades 12B having a helical tooth shape are alternately arranged along the circumferential direction. Thus, on the one end side of the gear workpiece W in the tooth trace direction, the first tool member 11 and the second tool member 12 can alternately perform the phrasing machining and the relief machining on the workpiece teeth W1 in a state in which the gear workpiece W and the tool 10 are in mesh with each other. Thus, in the gear machining process of step S11, the gear machining apparatus 1 can sequentially and continuously repeat the phrasing machining and the relief machining.

(3-1. Gear Machining Process)

Figure 7:
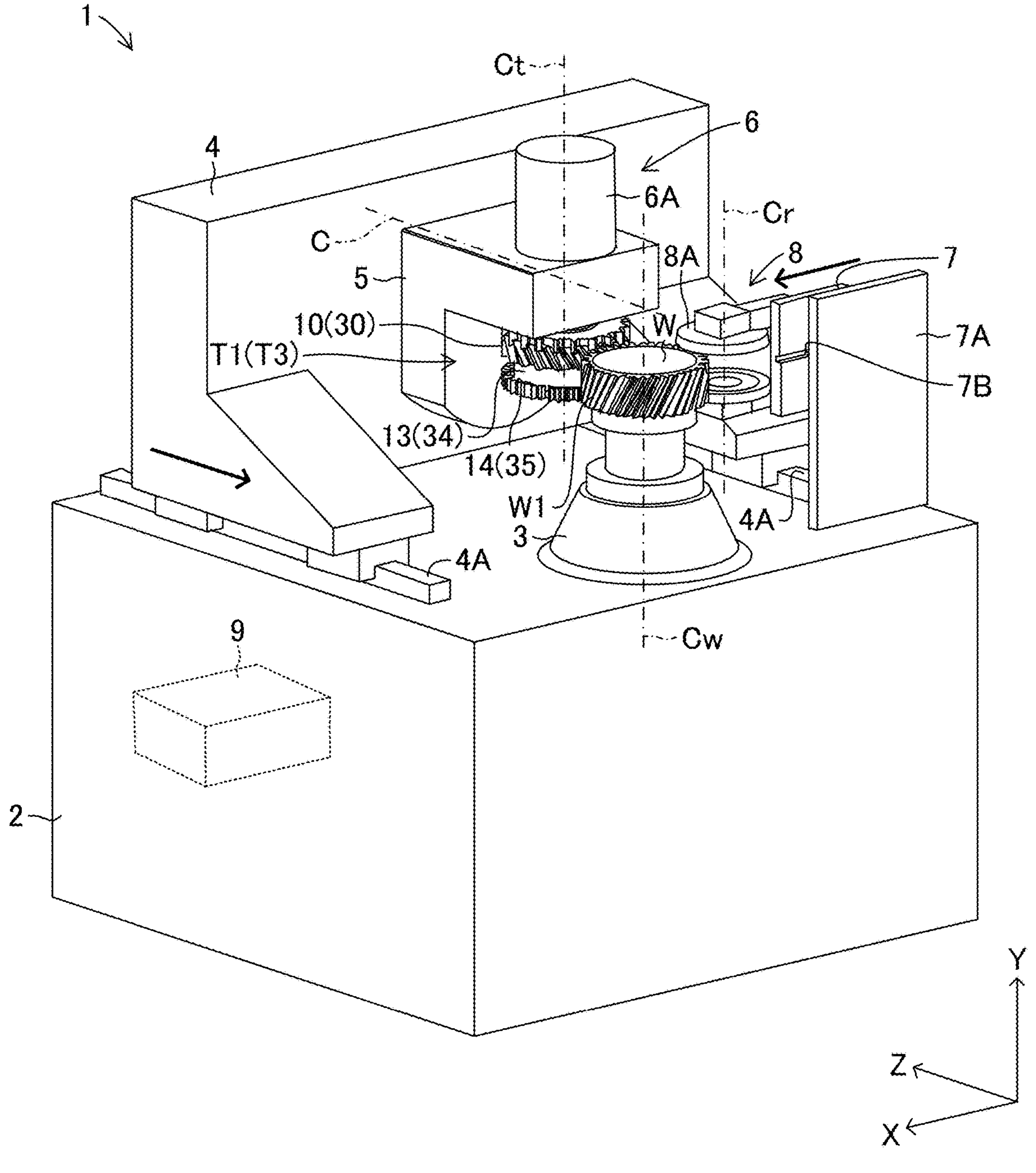
FIG. 7 is a view for explaining an operation of the gear machining apparatus.

As illustrated in FIG. 7, in the gear machining process, the phrasing machining and the relief machining are performed on the workpiece teeth W1 before the heat treatment by rotating the gear workpiece W and the tool 10 in mesh with each other. By performing the phrasing machining and the relief machining before the heat treatment, the phrasing portions W2 and the relief portions W3 can be roughly formed in advance before finishing. This shortens the machining time required for finishing, resulting in an enhancement in the productivity. Consequently, a high-performance gear having a higher load capacity can be produced while suppressing an increase in the production cost.

The control device 9 first moves the Z-axis moving table 4 in the Z-axis direction as indicated by a thick arrow in FIG. 7. That is, the control device 9 moves the tool spindle 6, that is, the tool unit T1 including the tool 10, toward the gear workpiece W. The control device 9 moves the X-axis moving table 7 in the X-axis direction as indicated by a thick arrow in FIG. 7. That is, the control device 9 moves the deburring roller 8 toward the gear workpiece W.

Figure 8:
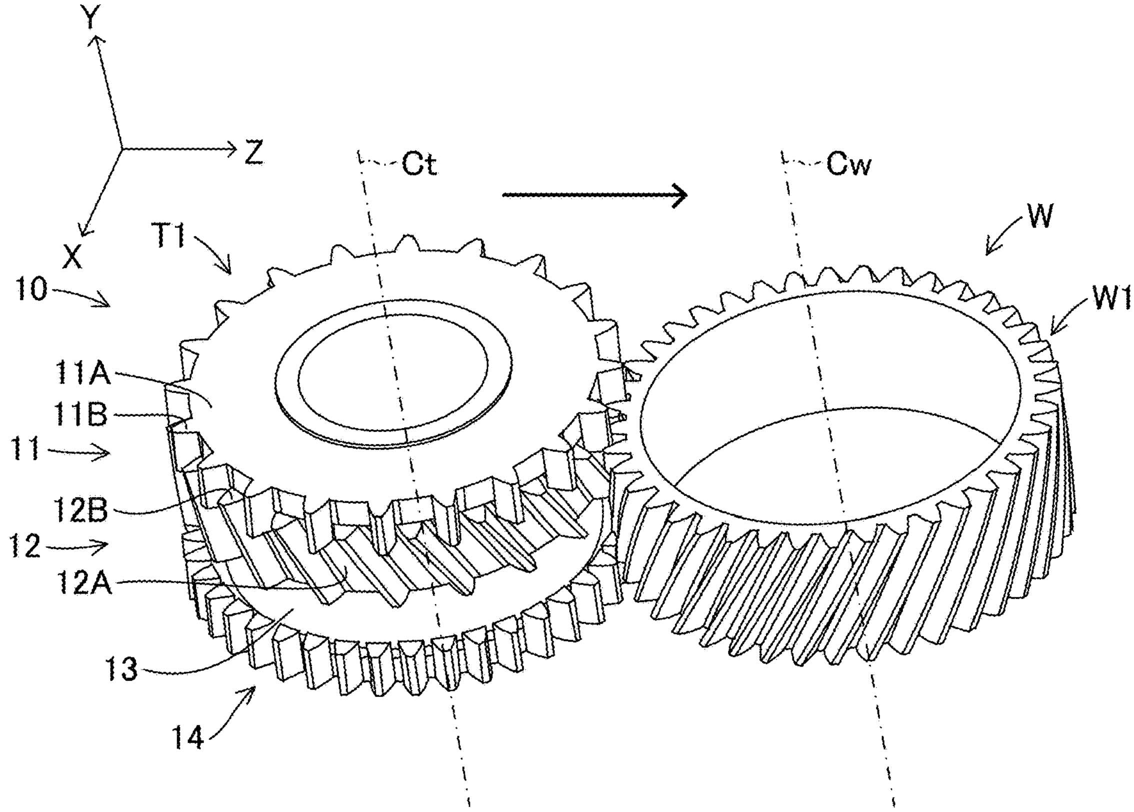
FIG. 8 is a view for explaining meshing between the tool according to the embodiment and the workpiece gear.

Subsequently, as illustrated in FIG. 8, the control device 9 causes a state in which the first machining blades 11B or the second machining blades 12B of the tool 10 mesh with the workpiece teeth W1 of the gear workpiece W and a state in which the phrasing cutter 14 of the tool unit T1 mesh with the workpiece teeth W1 of the gear workpiece W. In this state, the control device 9 can cause the gear workpiece W and the tool 10 to mesh with each other by reciprocating the Z-axis moving table 4 while rotating the tool spindle 6 at an extremely low speed, for example.

As illustrated in FIG. 7, the control device 9 causes the pair of rollers 8A of the deburring roller 8 that is moved to the vicinity of the gear workpiece W to approach each other. As a result, the pair of rollers 8A of the deburring roller 8 sandwich the side surfaces of the gear workpiece W. The control device 9 can reciprocate, in the phrasing machining, the X-axis moving table 7 so that the rollers 8A of the deburring roller 8 rotate together with the gear workpiece W while holding the side surfaces of the gear workpiece W.

As indicated by a thick arrow in FIG. 8, the control device 9 controls the motors (not shown) etc., to move the Z-axis moving table 4 so that the tool 10 and the phrasing cutter 14 that are in mesh with the gear workpiece W press the gear workpiece W with a predetermined pressing force in the Z-axis direction. That is, during machining, the tool 10 and the phrasing cutter 14 are kept in a state in which the tool 10 and the phrasing cutter 14 always press the gear workpiece W with a predetermined pressing force.

Subsequently, the control device 9 causes the spindle motor 6A of the tool spindle 6 to generate a rotational driving force to rotate the tool unit T1. As a result, the gear workpiece W supported by the workpiece spindle 3 rotates together with the tool unit T1 in accordance with the rotational driving of the tool unit T1. In a state in which the gear workpiece W and the tool 10 rotate together, the first machining blades 11B and the phrasing cutter 14 perform phrasing machining on the end portion W2 of each workpiece tooth W1. Further, the second machining blade 12B adjacent to the first machining blade 11B that performs the phrasing machining performs relief machining on the corner portion W3 following the phrasing machining by the first machining blade 11B. That is, the gear machining apparatus 1 sequentially and continuously repeats the phrasing machining and the relief machining on the workpiece teeth W1 of the gear workpiece W in one gear machining process.

Figure 9:
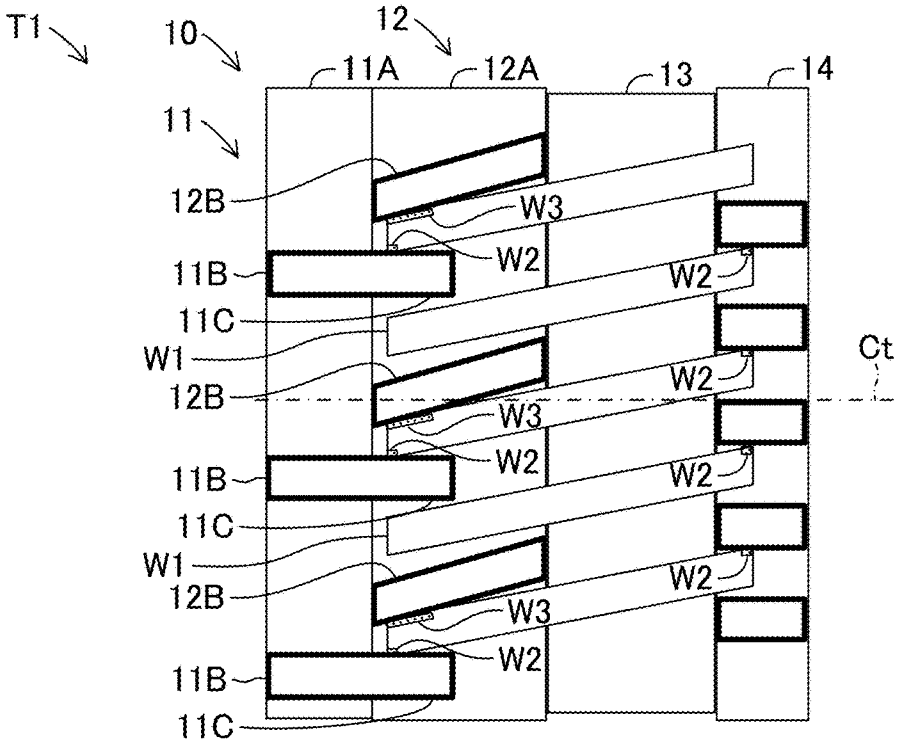
FIG. 9 is a view along a pitch circle illustrating first machining and second machining of the workpiece gear performed by a tool unit according to the embodiment.

In this case, as illustrated in FIG. 9, the first machining blade 11B of the first tool member 11 presses the end portion W2 on the one end side of the workpiece tooth W1 to chamfer the end portion W2, thereby forming the phrasing portion W2. Further, the second machining blade 12B of the second tool member 12 removes a corner edge of the corner portion W3 to form the relief portion W3 by pressing the corner portion W3 while moving the machining point in the direction along the rotation axis Ct at the corner portion W3 on the side adjacent to the formed phrasing portion W2 in the circumferential direction, for the workpiece tooth W1 in which the phrasing portion W2 has been formed by the first machining blade 11B.

Here, although not shown, the position at which the corner portion W3, that is, the relief portion W3, is formed differs depending on whether the completed gear is a drive gear or a driven gear. For example, in a case where the completed gear is a drive gear, the relief portion W3 is formed at the corner portion W3 on the toot root side of the workpiece tooth W1 (see FIG. 2) since the completed gear starts to mesh with the counterpart gear on the tooth root side in the workpiece radial direction. In a case where the completed gear is a driven gear, on the other hand, the relief portion W3 is formed at the corner portion W3 on the tooth tip side of the workpiece tooth W1 (see FIG. 2) since the completed gear starts to mesh with the counterpart gear on the tooth tip side in the workpiece radial direction.

Further, the phrasing cutter 14 presses the end portion W2 of each workpiece tooth W1 on the other end side opposite to the machining position by the first machining blades 11B and the second machining blades 12B in the direction of the rotation axis Ct, thereby chamfering the workpiece tooth W1 to form the phrasing portion W2. Further, the phrasing cutter 14 presses the end portion W2 on the other end side of the workpiece tooth W1 with which the first machining blade 11B and the second machining blade 12B are in contact and the workpiece tooth W1 with which the first machining blade 11B and the second machining blade 12B are not in contact, thereby chamfering the workpiece teeth W1 to form the phrasing portions W2.

As described above, when the tool 10 machines the workpiece teeth W1 of the gear workpiece W, the machining time can be considerably reduced as compared with, for example, a case where the phrasing machining is performed by using a single phrasing cutter and then the relief machining is performed after changing to a separate single relief cutter. More specifically, when the tool 10 is used, the phrasing machining and the relief machining can be continuously repeated without a changeover.

Therefore, when the tool 10 is used, the phrasing machining and the relief machining can be performed in substantially the same machining time as the machining time in which only the conventional phrasing machining is performed. Therefore, when the tool 10 is used, the production efficiency for producing gears can be improved. In addition, when the tool 10 is used, there is no need for a changeover. Thus, it is not necessary to clearly distinguish and set the phrasing machining and the relief machining, and it is not necessary to provide a dedicated machine for the phrasing machining or the relief machining.

As can be understood from the above description, the tool 10 includes: the first tool member 11 having the first machining blades 11B formed on the outer peripheral surface of the first tool body 11A and configured to perform the phrasing machining as the first machining on the gear workpiece W (workpiece gear W) as the workpiece; and the second tool member 12 having the second machining blades 12B formed on the outer circumferential surface of the second tool body 12A and configured to perform the relief machining as the second machining on the gear workpiece W. In a state in which the first tool member 11 and the second tool member 12 are combined such that the rotation axes Ct of the first tool body 11A and the second tool body 12A are coaxial with each other, the first machining blades 11B of the first tool member 11, which are the machining blades of one of the first tool member 11 and the second tool member 12, are formed to protrude toward the second tool member 12, which is the other of the first tool member 11 and the second tool member 12, and the second machining blades 12B of the second tool member 12 are positioned at predetermined intervals in the circumferential direction relative to the protruding portions of the first machining blades 11B.

Here, the first machining blades 11B are formed on the outer circumferential surface of the first tool body 11A so as to be parallel to the rotation axis Ct of the disk-shaped first tool body 11A and perform the first machining on the workpiece teeth W1 of the gear workpiece W. The second machining blades 12B are formed on the outer circumferential surface of the second tool body 12A so as to be twisted with respect to the rotation axis Ct and have a blade length along the direction of the rotation axis Ct longer than that of the first machining blades 11B such that the machining point with respect to the workpiece tooth W1 of the gear workpiece W is movable. The second machining blades 12B perform the second machining on the workpiece teeth W1 of the gear workpiece W.

Accordingly, the tool 10 includes the first machining blades 11B that perform the first machining and the second machining blades 12B that perform the second machining in which the machining point is moved unlike the first machining. The tool 10 continuously and repeatedly performs the first machining and the second machining on the gear workpiece W. Thus, in a case where the tool 10 is used, the machining time can be reduced because a time for changeover or the like is not required, as compared with a case where the first machining and the second machining are separately performed on the workpiece teeth of the gear workpiece W, that is, a case where only the first machining is performed and then only the second machining is performed. Accordingly, the production efficiency for producing gears can be improved when the tool 10 is used.

Because the tool 10 can continuously and repeatedly perform the first machining and the second machining which are different from each other, it is not necessary to prepare a process or a machining device dedicated to the first machining or prepare a process or a machining device dedicated to the second machining. Thus, if the tool 10 is used, it is possible to suppress an increase in production cost even when a high-performance gear having a higher load capacity is produced.

(4) First Modification

In the embodiment illustrated above, the gear machining apparatus 1 performs the relief machining on the workpiece teeth W1 of the gear workpiece W as the second machining. Instead, the gear machining apparatus 1 can also perform, as the second machining, shaving machining for removing irregularities or unevenness on the tooth surface by moving the machining point on the tooth surface while meshing with the gear workpiece W and contacting the tooth surface. Hereinafter, the first modification will be specifically described.

Figure 10:
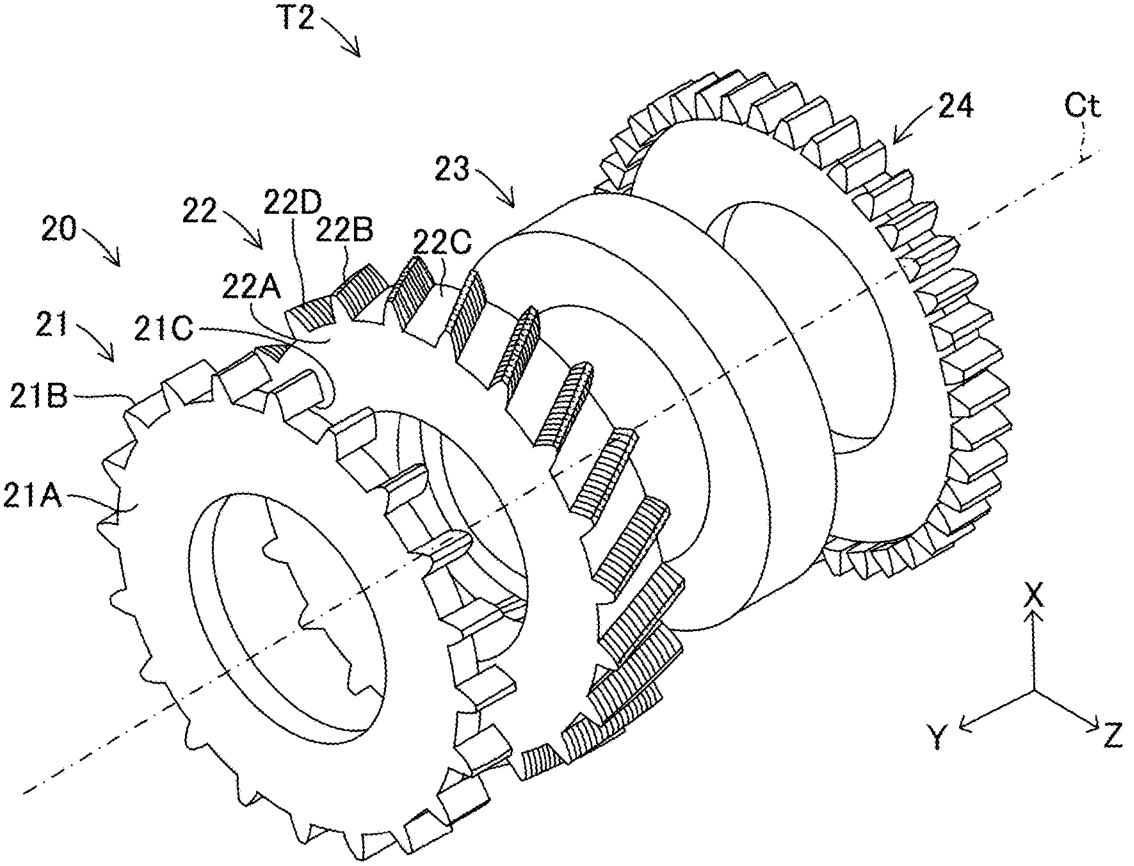
FIG. 10 is a schematic view illustrating a configuration of a tool according to a first modification.

In the first modification, as illustrated in FIG. 10, a tool 20 includes a first tool member 21 and a second tool member 22. The tool 20 is formed by combining the first tool member 21 and the second tool member 22 with each other. As in the tool unit T1, in a tool unit T2, the tool 20 and a phrasing cutter 24 are integrally assembled via a spacer 23 so as to be coaxial with each other such that a space, which corresponds to the tooth width of the gear workpiece W in the tooth trace direction, is interposed between the tool 20 and the phrasing cutter 24.

In the first modification, like the first tool member 11 of the illustrated embodiment, the first tool member 21 is a tool member that performs the phrasing machining on the gear workpiece W as the first machining. The first tool member 21 includes a disk-shaped first tool body 21A. The first tool member 21 includes first machining blades 21B (i.e., phrasing blades) that are formed on the outer circumferential surface of the first tool body 21A so as to be parallel with the rotation axis Ct of the first tool body 21A for performing the phrasing machining.

The second tool member 22 is a tool member that performs shaving machining on the workpiece teeth W1 of the gear workpiece W as the second machining different from the first machining. The second tool member 22 includes a disk-shaped second tool body 22A different from the first tool body 21A. The second tool member 22 includes second machining blades 22B that are formed on the outer circumferential surface of the second tool body 22A so as to be twisted with respect to the rotation axis Ct of the second tool body 22A for performing the shaving machining.

Each second machining blade 22B includes a large number of serration grooves 22D on the blade surface for removing irregularities or unevenness (what is called polygonal errors) on the tooth surface of the workpiece tooth W1 while cutting the irregularities. That is, the second machining blade 22B is a shaving blade for performing the shaving machining. Thus, in the first modification, the tool 20 is formed by combining the first machining blades 21B (phrasing blades) that perform the phrasing machining as the first machining and the second machining blades 22B (shaving blades) that perform the shaving machining as the second machining. The second machining blade 22B can perform, for example, crowning for forming a bulge at a central portion of the workpiece tooth W1 in the tooth trace direction. Since the second machining blade 22B can remove irregularities on the tooth surface of the workpiece tooth W1, the relief machining for removing the corner edge of the corner portion W3 can be performed as in the embodiment illustrated above.

As in the tool 10 described above, in the tool 2, the first tool body 21A and the second tool body 22A are combined such that the rotation axes Ct thereof are coaxial with each other. Also in the first modification, the first machining blades 21B of the first tool member 21 are formed so as to protrude toward the second tool member 22. In the second tool member 22, the second machining blades 22B and removed portions 22C are formed such that the second machining blades 22B are positioned at predetermined intervals in the circumferential direction relative to protruding portions 21C of the first machining blades 21B of the first tool member 21.

Figure 6:
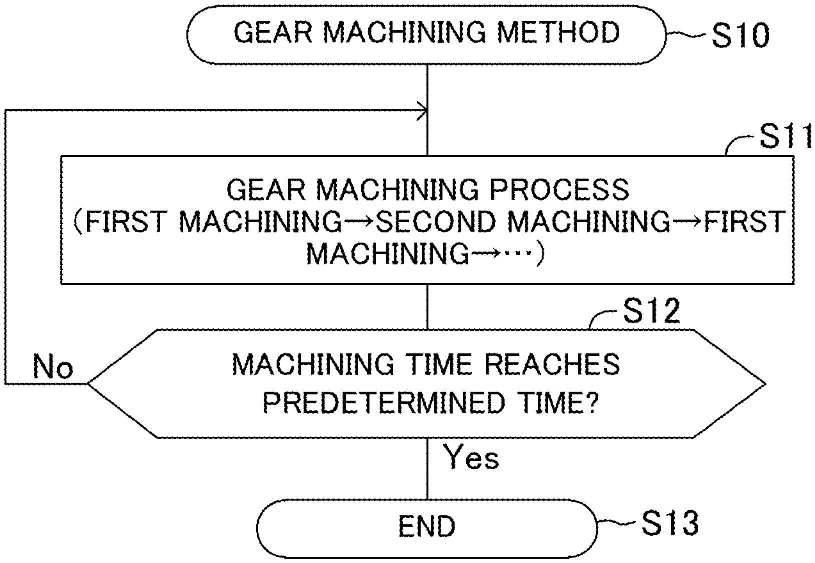
FIG. 6 is a flowchart representing one example of a method of machining a gear.

Next, a gear machining method will be described in which the phrasing machining and the shaving machining are performed on the gear workpiece W (workpiece gear W) before heat treatment in a state in which the tool unit T2 including the tool 20 is attached to the gear machining apparatus 1 described above. Specifically, as in the embodiment illustrated above, in the first modification, the phrasing machining and the shaving machining are sequentially and continuously repeated in the gear machining process illustrated in FIG. 6.

Figure 11:
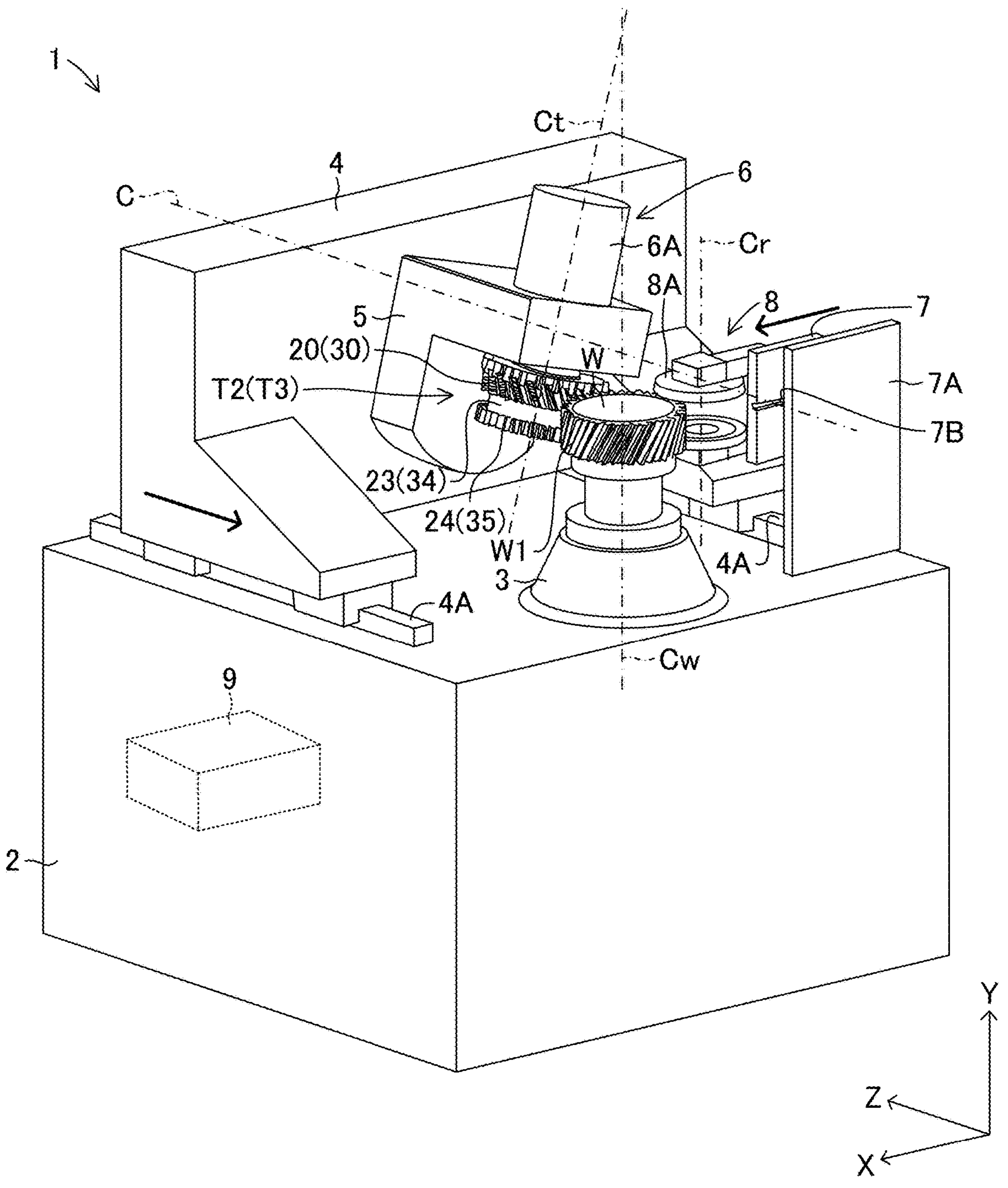
FIG. 11 is a view for explaining an operation of a gear machining apparatus according to the first modification.

In the first modification, as illustrated in FIG. 11, the control device 9 causes the tool spindle 6 of the gear machining apparatus 1, that is, the tool unit T2, to rotate around the C-axis. That is, the control device 9 causes the turning table 5 to operate so as to rotate the tool spindle 6, that is, the tool unit T2, around the C-axis. The amount of the rotation of the tool spindle 6, that is, the tool 20, around the C-axis is determined based on, for example, the amount of twisting of the second machining blade 22B with respect to the rotation axis Ct and the amount of twisting of the workpiece tooth W1 of the gear workpiece W with respect to the rotation axis Cw. This enables the second machining blade 22B to continuously come into contact with the tooth surface of the workpiece tooth W1 in the tooth trace direction. In other words, the machining point can be moved, and the irregularities of the tooth surface can be removed by the serration grooves 22D.

The control device 9 causes a state in which the first machining blades 21B or the second machining blades 22B of the tool 20 mesh with the workpiece teeth W1 of the gear workpiece W and a state in which the phrasing cutter 24 of the tool unit T2 mesh with the workpiece teeth W1 of the gear workpiece W. Also in the first modification, the tool 20 and the phrasing cutter 24 that are in mesh with the gear workpiece W are maintained in a state in which the tool 20 and the phrasing cutter 24 press the gear workpiece W with a predetermined pressing force in the Z-axis direction. Further, the control device 9 causes the pair of rollers 8A of the deburring roller 8 to sandwich the side surfaces of the gear workpiece W.

Subsequently, the control device 9 causes the spindle motor 6A of the tool spindle 6 to generate a rotational driving force to rotate the tool unit T2. As a result, the gear workpiece W supported by the workpiece spindle 3 rotates together with the rotational driving of the tool unit T1. In this way, in a state in which the gear workpiece W and the tool 20 are rotating together, the first machining blades 21B and the phrasing cutter 24 perform the phrasing machining on the workpiece teeth W1. Further, the second machining blade 22B adjacent to the first machining blades 21B that performs the phrasing machining performs the shaving machining following the phrasing machining by the first machining blade 21B. That is, in the gear machining process, the gear machining apparatus 1 of the first modification repeatedly and continuously repeats the phrasing machining and the shaving machining until the machining time reaches a predetermined time.

In the first modification, the phrasing portions W2 can be formed on the workpiece teeth W1 of the gear workpiece W by the phrasing machining as in the illustrated embodiment, and the shaving machining for removing the irregularities can be performed. In this case, since the gear machining apparatus 1 includes the tool unit T2 including the tool 20, it is possible to continuously and repeatedly perform the phrasing machining and the shaving machining on the workpiece teeth W1 of the gear workpiece W. Thus, the first modification also offers the same effects as those in the illustrated embodiment.

(5) Second Modification

There will be next described a second modification obtained by modifying the illustrated embodiment and the first modification. The tool 10 of the tool unit T1 of the illustrated embodiment includes the first tool member 11 that performs the first machining (specifically, the phrasing machining) and the second tool member 12 that performs the second machining (specifically, the relief machining), and the first tool member 11 and the second tool member 12 are combined. In this case, the first tool member 11 has the disk-shaped first tool body 11A, and the second tool member 12 has the disk-shaped second tool body 12A.

The tool 20 of the tool unit T2 of the first modification includes the first tool member 21 that performs the first machining (specifically, the phrasing machining) and the second tool member 22 that performs the second machining (specifically, the shaving machining), and the first tool member 21 and the second tool member 22 are combined. In this case, the first tool member 21 has the disk-shaped first tool body 21A, and the second tool member 22 has the disk-shaped second tool body 22A.

Figure 12:
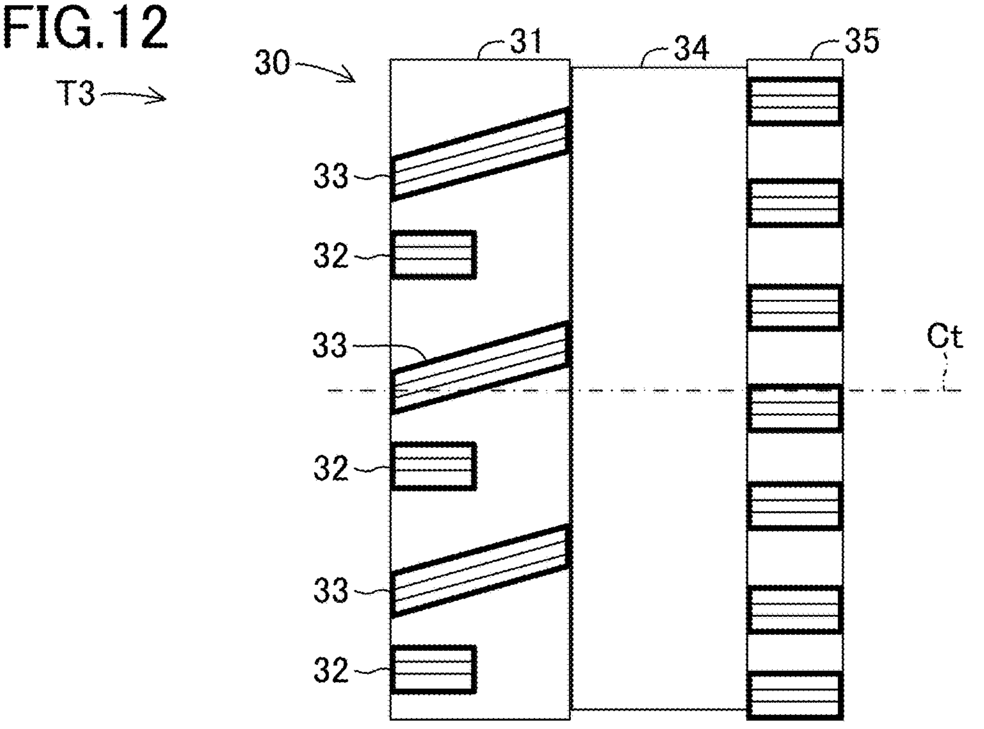
FIG. 12 is a view for explaining a configuration of a tool according to a second modification.

In this second modification, as illustrated in FIG. 12, a tool 30 that constitutes a tool unit T3 includes, for example, a disk-shaped tool body 31 in which the first tool body 11A and the second tool body 12A of the tool 10 are integrated. That is, the tool body 31 is formed by the first tool body 11A and the second tool body 12A. The tool body 31 may be formed by the first tool body 21A and the second tool body 22A of the tool 20.

First machining blades 32 that perform the first machining on the workpiece teeth W1 of the gear workpiece W are formed on the outer circumferential surface of the disk-shaped tool body 31. The first machining blades 32 are formed so as to be parallel to the rotation axis Ct of the tool body 31. The second modification exemplifies a case in which the first machining blades 32 are phrasing blades that perform the phrasing machining as the first machining.

Second machining blades 33 that perform the second machining on the workpiece teeth W1 of the gear workpiece W are formed on the outer circumferential surface of the tool body 31. The second machining blade 33 is formed so as to be twisted with respect to the rotation axis Ct of the tool body 31. The second machining blade 33 is formed so as to have a longer blade length along the direction of the rotation axis Ct than the first machining blade 32 so that the machining point with respect to the workpiece tooth W1 is movable. Here, in the second modification, a case where the second machining blade 33 is a relief blade that performs the relief machining as the second machining will be exemplified. The second machining blade 33 may be a shaving blade that performs the shaving machining as the second processing.

The first machining blades 32 and the second machining blades 33 are alternately arranged along the outer circumferential surface of the tool body 31 in accordance with the intervals of the workpiece teeth W1 in the circumferential direction of the gear workpiece W, like the tool 10 in which the first tool member 11 and the second tool member 12 are combined. As in the tool unit T1, in the tool unit T3, the tool 30 and the phrasing cutter 35 are integrally assembled via a spacer 34 so as to be coaxial with each other such that a space, which corresponds to the tooth width of the gear workpiece W in the tooth trace direction, is interposed between the tool 30 and the phrasing cutter 35.

Figure 13:
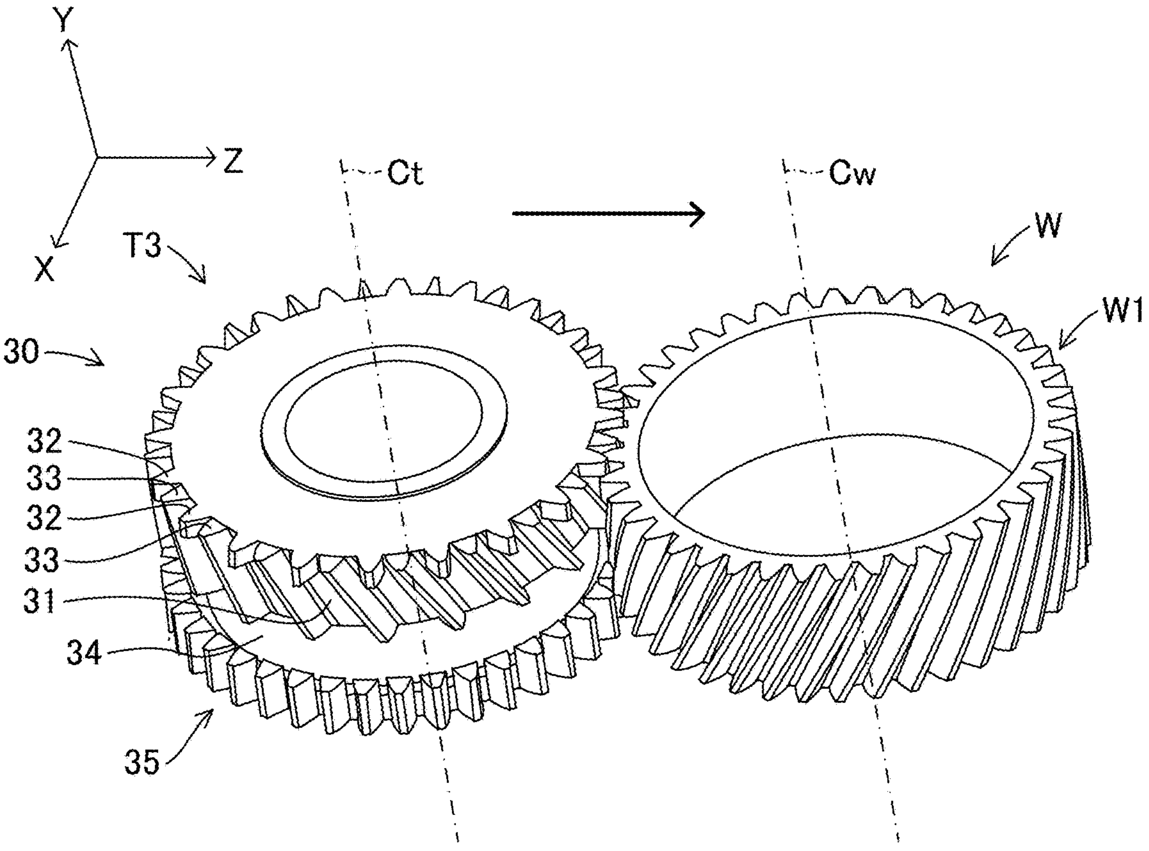
FIG. 13 is a view for explaining meshing between the tool according to the second modification and the gear workpiece.

The tool unit T3 including the tool 30 is also attached to the tool spindle 6 of the gear machining apparatus 1, and the gear machining process described above is performed, so that the phrasing machining as the first machining and the relief machining or the shaving machining as the second machining are performed on the workpiece teeth W1. That is, also in the second modification, the control device 9 controls the operation of the gear machining apparatus 1 to cause a state in which the first machining blades 32 or the second machining blades 33 of the tool 30 and the workpiece teeth W1 of the gear workpiece W are in mesh with each other and a state in which the phrasing cutter 35 of the tool 30 and the workpiece teeth W1 of the gear workpiece W are in mesh with each other, as illustrated in FIG. 13.

Also in the second modification, the control device 9 causes the spindle motor 6A of the tool spindle 6 to generate a rotational driving force so as to rotate the tool unit T3 pressing the gear workpiece W. Thus, the first machining blade 32 and the phrasing cutter 35 perform the phrasing machining on the workpiece teeth W1. The second machining blade 33 adjacent to the first machining blade 32 that performs the phrasing machining performs the relief machining or the shaving machining following the phrasing machining performed by the first machining blade 32. That is, also in the second modification, the gear machining apparatus 1 repeatedly and continuously repeats the phrasing machining and the relief machining or the shaving machining in the gear machining step illustrated in FIG. 6 until the machining time reaches the predetermined time. Thus, the second modification also offers the same effects as those in the illustrated embodiment and the first embodiment.

(6) Third Modification

The illustrated embodiment, the first modification, and the second modification exemplify the case where the first machining blades 11B, the first machining blades 21B, and the first machining blades 32 perform the phrasing machining as the first machining. In this case, as illustrated in FIG. 9, the first machining blades 11B, 21B, and 32 and the phrasing cutters 14, 24, and 35 press the workpiece tooth W1 with their surfaces parallel to the rotation axis Ct so as to chamfer the workpiece teeth W1, thereby forming the phrasing portions W2.

Figure 14:
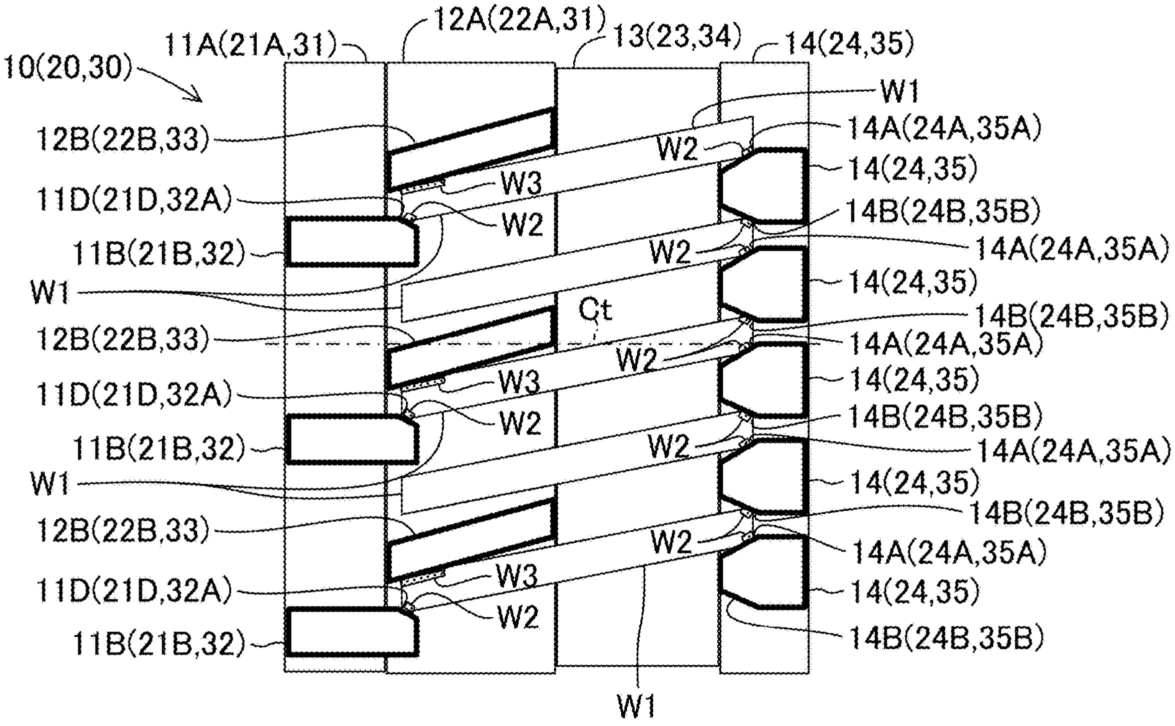
FIG. 14 is a view along a pitch circle illustrating first machining and second machining of the workpiece gear performed by a tool unit according to a third modification.

Instead, in the third modification, as illustrated in FIG. 14, the first machining blades 11B, 21B, and 32 are respectively provided with a chamfering portion 11D, a chamfering portion 21D, and a chamfering portion 32A for chamfering the workpiece teeth W1. Thus, in the third modification, the tools 10, 20, and 30 chamfer the workpiece teeth W1 by pressing the chamfering portions 11D, 21D, and 32A against the workpiece teeth W1 in the phrasing machining. As a result, the phrasing portions W2 having a desired shape can be formed on the workpiece teeth W1.

In the third modification, as illustrated in FIG. 14, the phrasing cutters 14, 24, and 35 are respectively provided with chamfering portions 14A and 14B, chamfering portions 24A and 24B, and chamfering portions 35A and 35B for chamfering two adjacent workpiece teeth W1 of the gear workpiece W. Thus, in the third modification, the tools 10, 20, and 30 press the chamfering portions 14A, 24A, and 35A against one of the two adjacent workpiece teeth W1 of the gear workpiece W and press the chamfering portions 14B, 24B, and 35B against the other of the two adjacent workpiece teeth W1 in the phrasing machining, thereby chamfering the workpiece teeth W1. As a result, it is possible to form the phrasing portions W2 having a desired shape on the workpiece tooth W1 and to shorten the machining time.

(7) Fourth Modification

Figure 15:
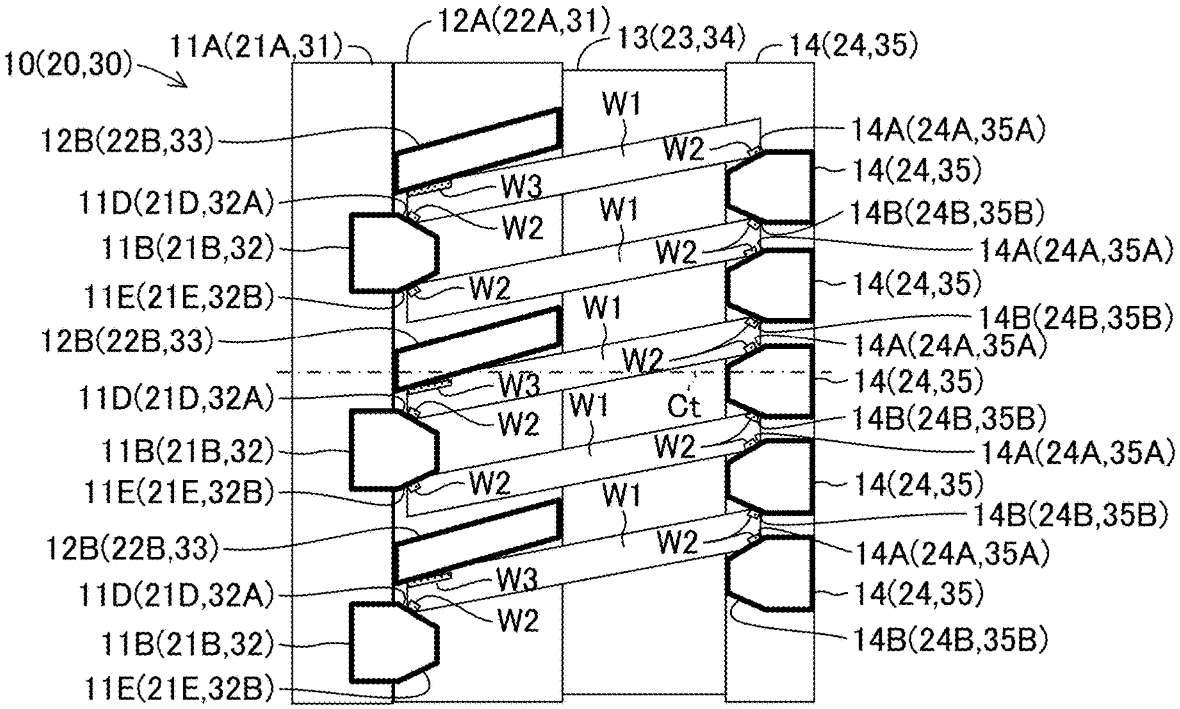
FIG. 15 is a view along the pitch circle illustrating the first machining and the second machining of the workpiece gear performed by a tool unit according to a fourth modification.

In the third modification described above, the first machining blades 11B, 21B, and 32 are provided with the chamfering portions 11D, 21D, and 32A only on one side thereof, and the phrasing machining is performed on one workpiece tooth W1 of the gear workpiece W. In addition, as illustrated in FIG. 15, the first machining blades 11B, 21B, and 32 may be respectively provided with chamfering portions 11D and 11E, chamfering portions 21D and 21E, and chamfering portions 32A and 32B for chamfering two adjacent workpiece teeth W1 in the gear workpiece W. Accordingly, the fourth modification enables the phrasing portions W2 having a desired shape to be formed on the workpiece tooth W1 and enables the machining time to be further reduced.

(8) Fifth Modification

Figure 16:
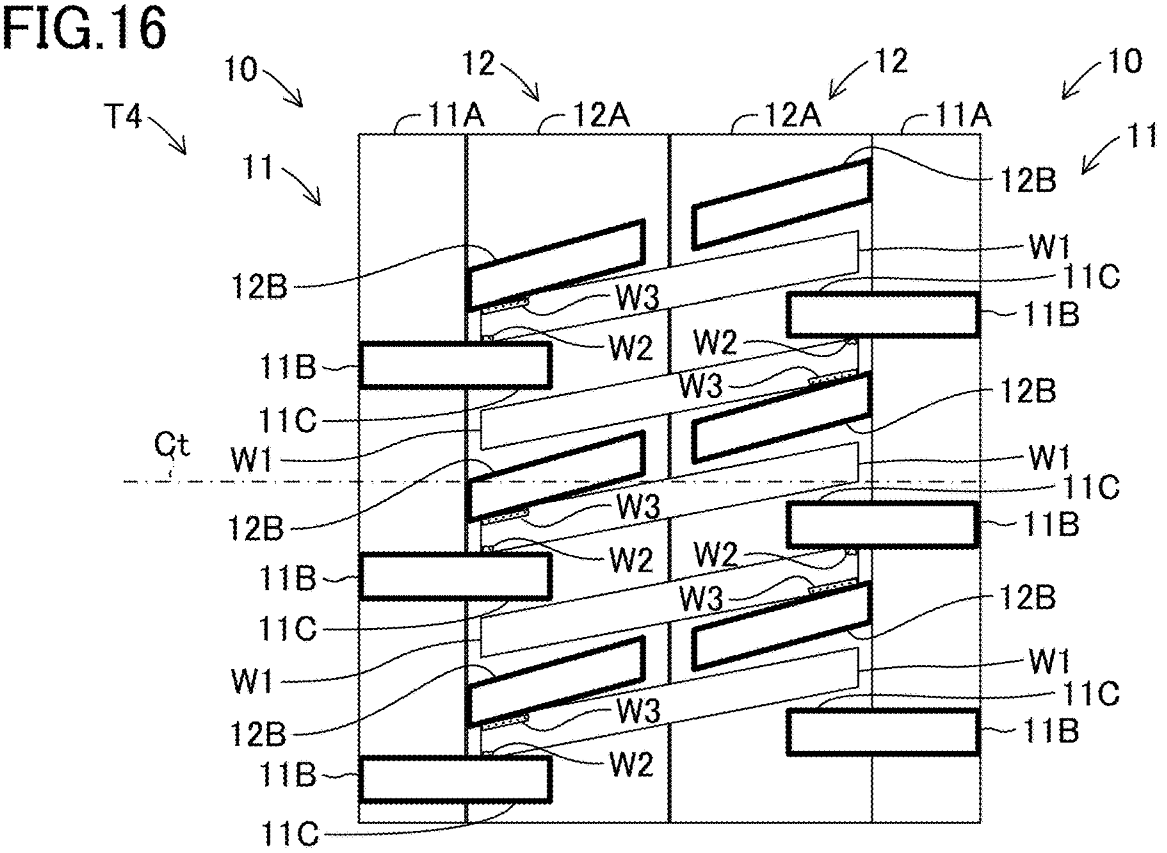
FIG. 16 is a view along the pitch circle illustrating the first machining and the second machining of the workpiece gear performed by a tool unit according to a fifth modification.

In the illustrated embodiment and modifications, the tool units T1, T2, and T3 are configured such that the tools 10, 20, and 30 and the phrasing cutters 14, 24, and 35 are assembled via the spacers 13, 23, and 34 interposed therebetween. The phrasing cutters 14, 24, and 35 and the spacers 13, 23, and 34 of the tool units T1, T2, and T3 may be omitted, and the two tools 10, 20, and 30 may be assembled using bolts or the like. For example, as illustrated in FIG. 16, a tool unit T4 may be formed by assembling the two tools 10.

Figure 17:
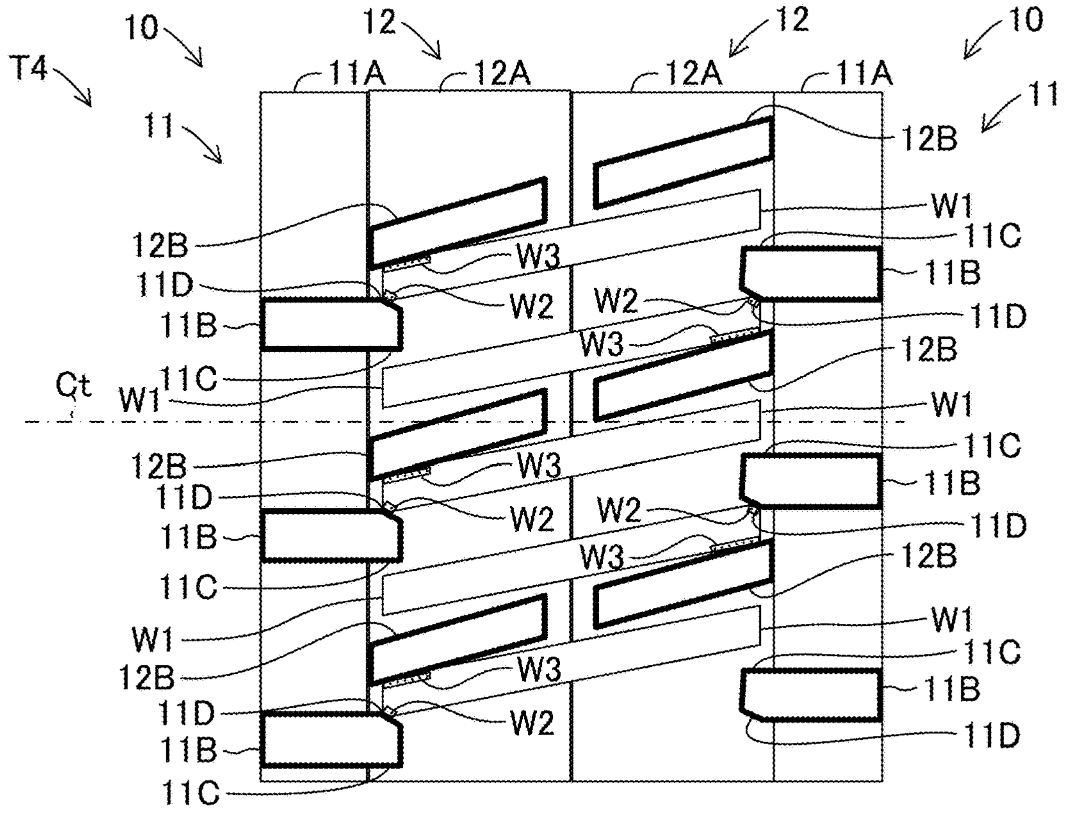
FIG. 17 is a view along the pitch circle illustrating the first machining and the second machining of the workpiece gear performed by the tool unit according to the fifth modification.
Figure 18:
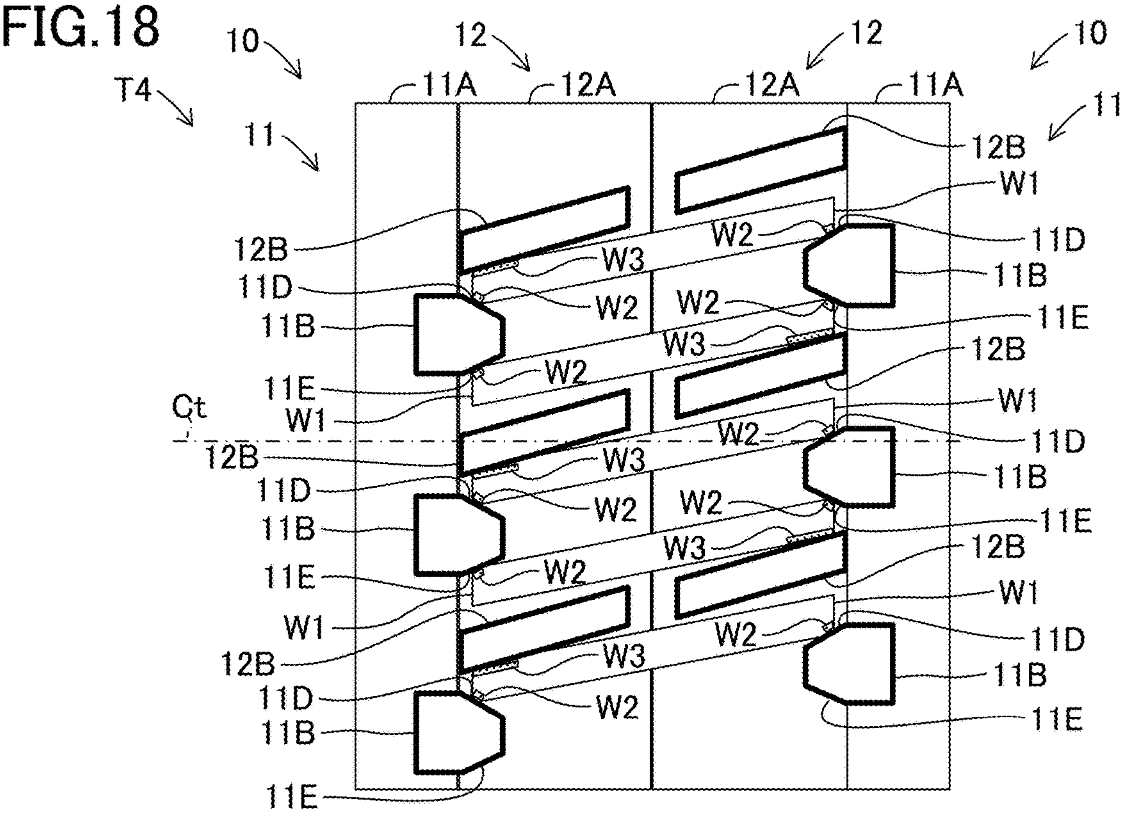
FIG. 18 is a view along the pitch circle illustrating the first machining and the second machining of the workpiece gear performed by the tool unit according to the fifth modification.

In this case, as illustrated in FIG. 17, in the tools 10 that constitute the tool unit T4, the chamfering portion 11D may be provided for each first machining blade 11B in the same manner as in the third modification described above. In this case, as illustrated in FIG. 18, the tools 10 that constitute the tool unit T4 may be provided with the chamfering portions 11D and 11E for each first machining blade 11B in the same manner as in the fourth modification described above. The fifth modification exemplifies the tool unit T4 constituted by the two tools 10. It is possible to constitute a tool unit by the two tools 20 or the two tools 30.

(9) Sixth Modification

Figure 19:
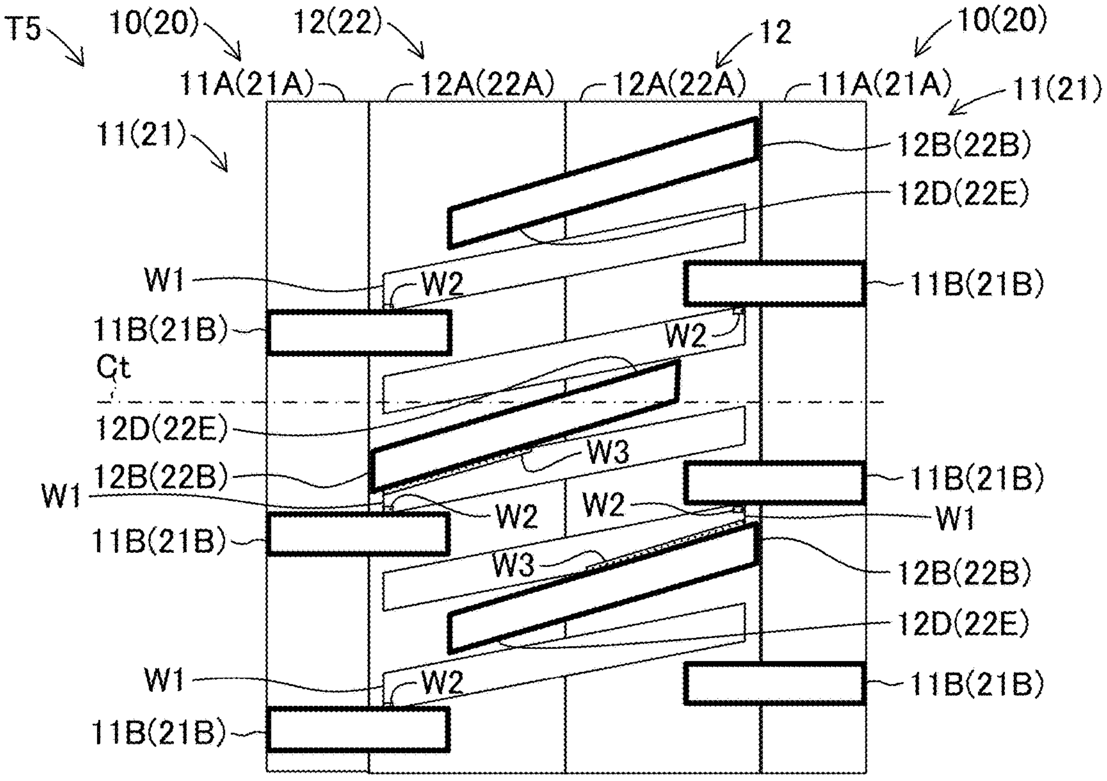
FIG. 19 is a view along the pitch circle illustrating the first machining and the second machining of the workpiece gear performed by a tool unit according to a sixth modification.

The illustrated embodiment and the modifications other than the second modification exemplify the case where the first machining blades 11B of the first tool member 11 have the protruding portions 11C protruding toward the second tool member 12. As illustrated in FIG. 19, in a case where a tool unit T5 is constituted by the two tools 10, the second machining blades 12B of the second tool member 12 may have, for example, protruding portions 12D protruding toward another second tool member 12 that is adjacent on one side thereof opposite to the first tool member 11 along the rotation axis Ct. Further, as illustrated in FIG. 19, in a case where the tool unit T5 is configured by the two tools 20, the second machining blades 22B of the second tool member 22 may have, for example, protruding portions 22E protruding toward another second tool member 22 that is adjacent on one side thereof opposite to the first tool member 21 along the rotation axis Ct.

In this case, the blade length of the second machining blade 12B of the second tool member 12 is set to be longer, so that the relief portion W3 can be made large along the tooth trace direction by setting an angle between the second machining blade 12B and the workpiece tooth W1 to be small. That is, since the blade length of the second machining blade 12B can be made long, it is possible to widen, as necessary, the region in which the relief machining is performed. In a case where the shaving machining is performed as the second machining, the serration grooves 22D of the second machining blade 22B easily come into contact with the tooth surface of the workpiece tooth W1 since the blade length of the second machining blade 22B can be set made long. Accordingly, the tooth surface of the workpiece tooth W1 can be ground more smoothly.

Figure 20:
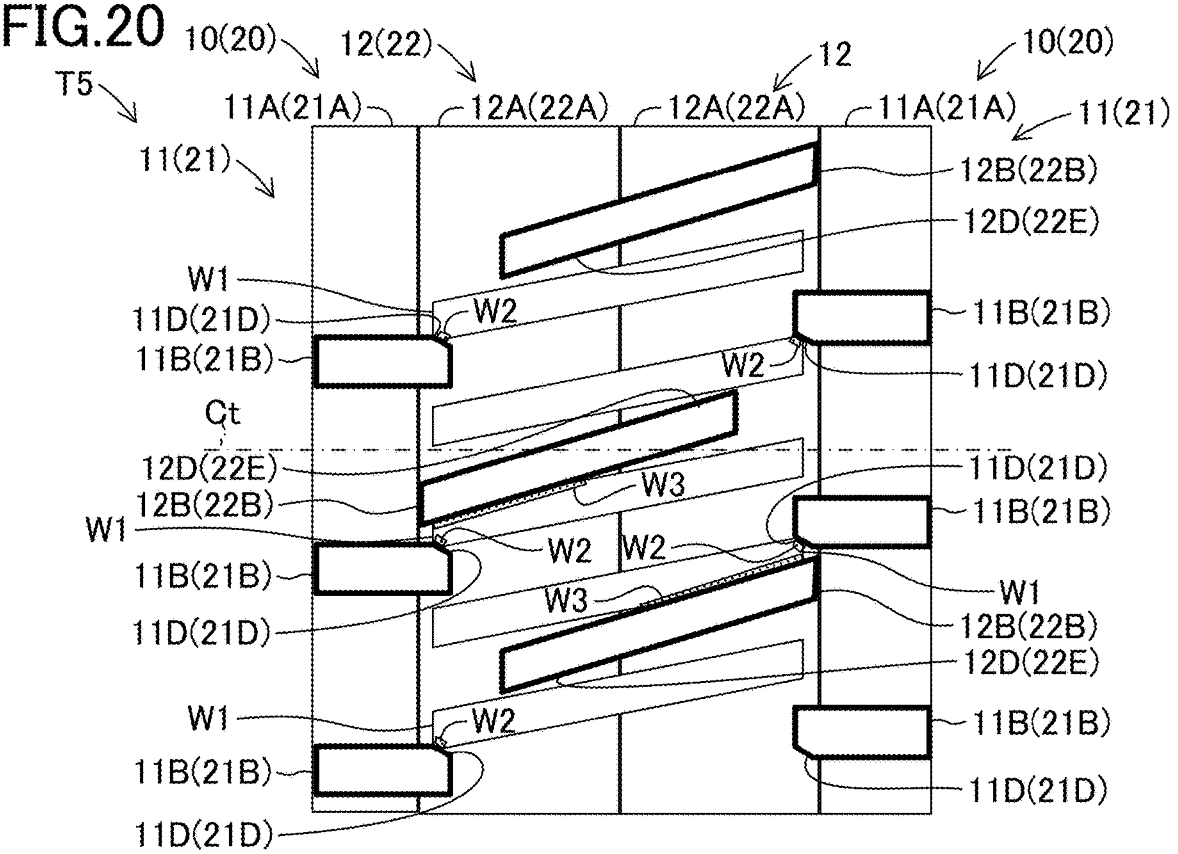
FIG. 20 is a view along the pitch circle illustrating the first machining and the second machining of the workpiece gear performed by the tool unit according to the sixth modification.
Figure 21:
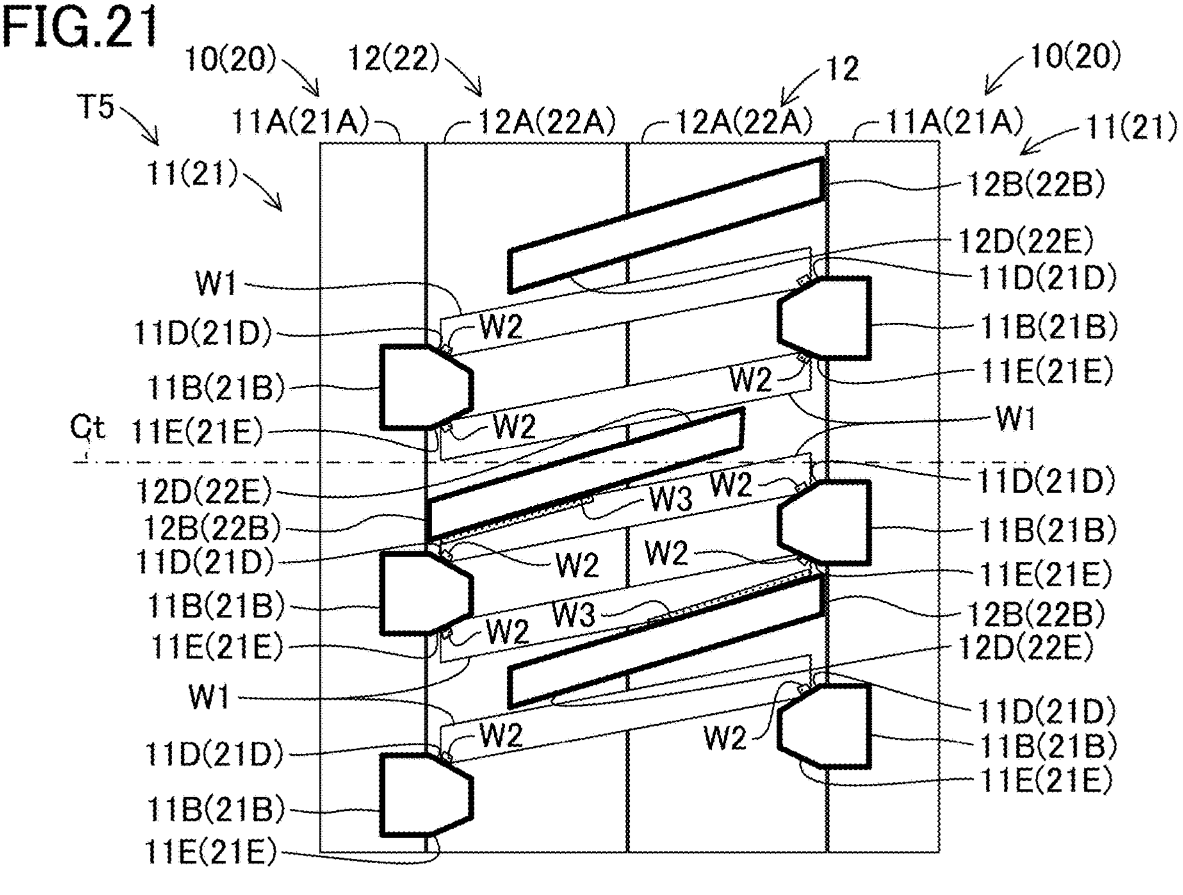
FIG. 21 is a view along the pitch circle illustrating the first machining and the second machining of the workpiece gear performed by the tool unit according to the sixth modification.

In this case, as illustrated in FIG. 20, in the tools 10 or the tools 20 that constitute the tool unit T5, the chamfering portions 11D are provided for the first machining blades 11B or the chamfering portions 21D are provided for the first machining blades 21B in the same manner as in the third modification described above. In this case, as illustrated in FIG. 21, in the tools 10 or the tools 20 that constitute the tool unit T5, the chamfering portions 11D and 11E for chamfering are provided for the first machining blades 11B or the chamfering portions 21D and 21E for chamfering are provided for the first machining blades 21B in the same manner as in the fourth modification described above.

10. Seventh Modification

Figure 22:
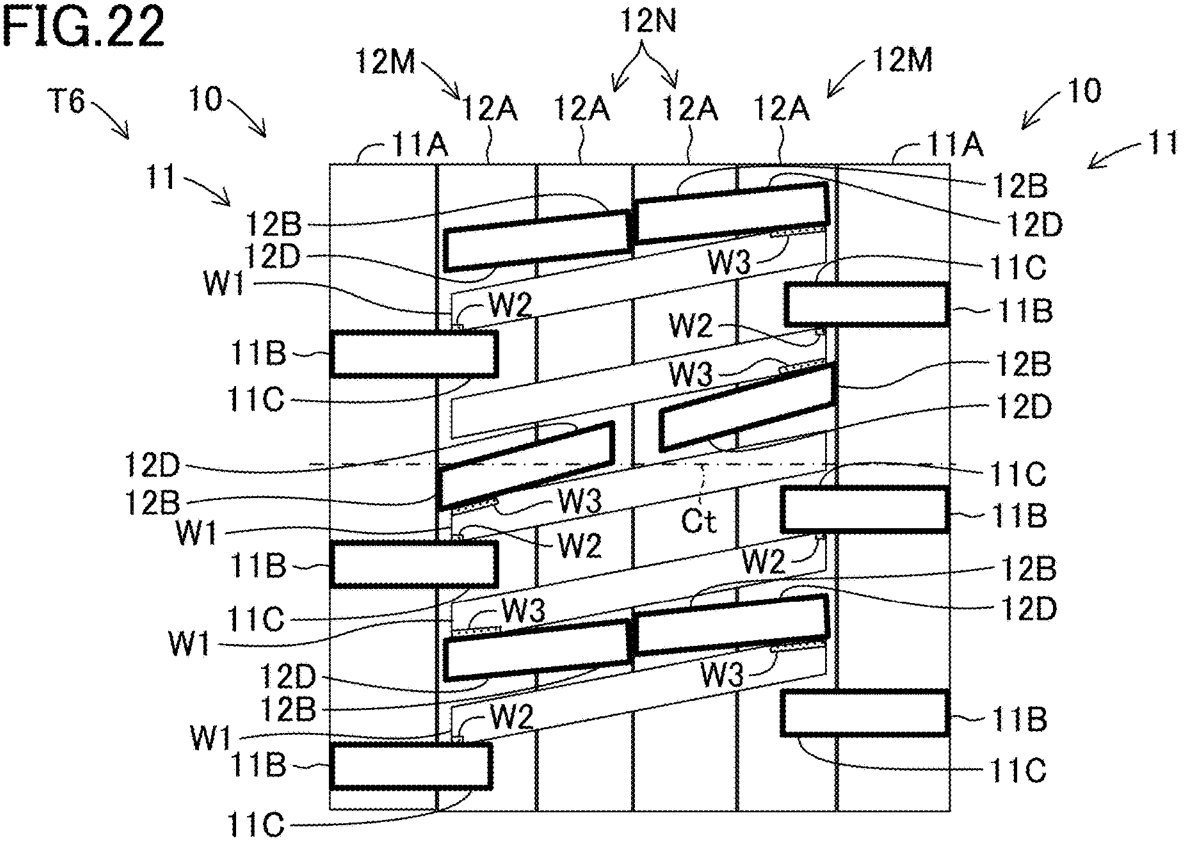
FIG. 22 is a view along the pitch circle illustrating the first machining and the second machining of the workpiece gear performed by a tool unit according to a seventh modification.

In the illustrated embodiment and each of the modifications other than the second modification, each of the tool units T1, T2, T4, and T5 includes the tool 10 in which one first tool member 11 and one second tool member 12 are combined or the tool 20 in which one first tool member 21 and one second tool member 22 are combined. Additionally or alternatively, each of the tool units T1, T2, T4, and T5 may have a tool 10 in which a plurality of first tool members 11 and a plurality of second tool members 12 are combined or a tool 20 in which a plurality of first tool members 21 and a plurality of second tool members 22 are combined. Specifically, as illustrated in FIG. 22, a tool unit T6 may include, for example, a tool 10 having one first tool member 11 and two second tool members 12M and 12N.

In the two second tool members 12M and 12N, the arrangement of the second machining blades 12B of the second tool member 12M and the arrangement of the second machining blades 12B of the second tool member 12N may differ from each other so that the machining positions with respect to the respective workpiece teeth W1 differ from each other. For example, as illustrated in FIG. 22, the second machining blade 12B of the second tool member 12M has a small contact angle with respect to the workpiece tooth W1. On the other hand, as illustrated in FIG. 22, the second machining blade 12B of the second tool member 12N has a large contact angle with respect to the workpiece tooth W1. According to this configuration, when the relief machining is performed, the second tool member 12M and the second tool member 12N perform the relief machining on different corner portions W3 (relief portions W3) of the workpiece tooth W1, that is, two corner portions W3.

Thus, according to the seventh modification, it is possible to increase the number of locations where the second machining, e.g., the relief processing, can be performed, resulting in a reduced machining time. Here, the two second tool members 12M and 12N perform the second machining at different machining positions. Therefore, the two second tool members 12M and 12N may be regarded as one second tool member 12. It is needless to say that the second machining is not limited to the relief machining but may include the shaving machining described above.

Figure 23:
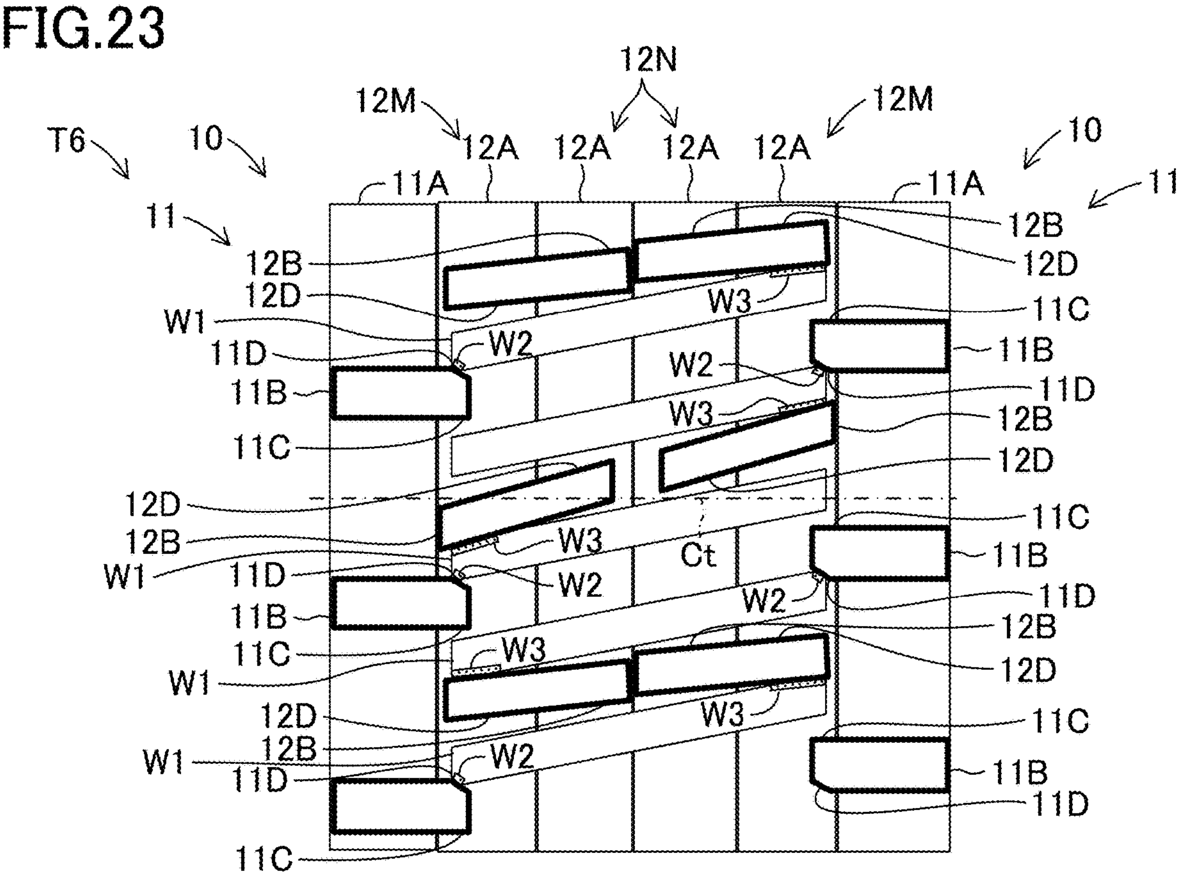
FIG. 23 is a view along the pitch circle illustrating the first machining and the second machining of the workpiece gear performed by the tool unit according to the seventh modification.
Figure 24:
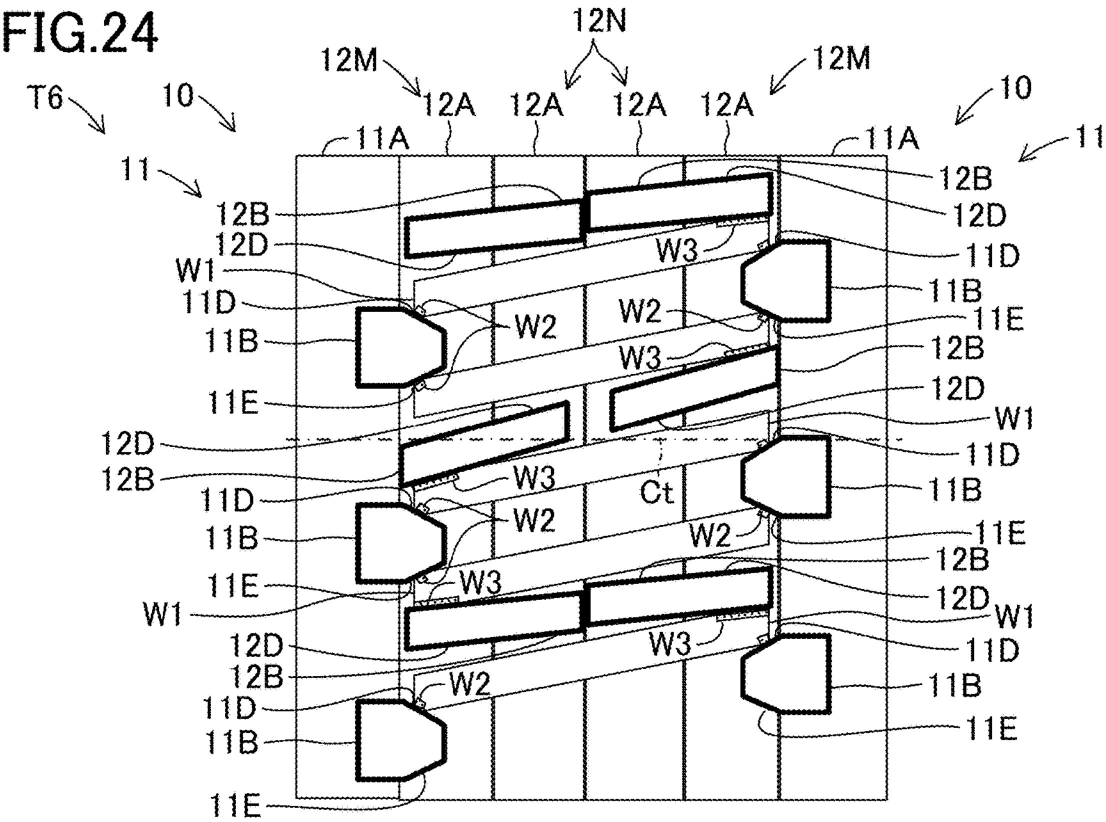
FIG. 24 is a view along the pitch circle illustrating the first machining and the second machining of the workpiece gear performed by the tool unit according to the seventh modification.

Also in this case, as illustrated in FIG. 23, in the tool 10 that constitute the tool unit T6, the chamfering portions 11D may be provided for the first machining blades 11B in the same manner as in the third modification described above. Also in this case, as illustrated in FIG. 24, in the tool 10 that constitute the tool unit T6, the chamfering portions 11D and 11E may be provided for the first machining blades 11B in the same manner as in the fourth modification described above. Although not illustrated, the chamfering portions may be provided in the tool 20 in the same manner.

11. Eighth Modification

The illustrated embodiment and the modifications described above exemplify the case where the blade height of the first machining blades 11B, 21B, and 32 is the same as the blade height of the second machining blades 12B, 22B, and 33. In the first machining and the second machining, a force required for machining the workpiece teeth W1 of the gear workpiece W, i.e., a machining force, may be different. As described above, the gear machining apparatus 1 performs machining while pressing the tool spindle 6, i.e., the tools 10, 20, and 30, toward the gear workpiece W so as to generate a predetermined pressing force in a state in which the tools 10, 20, and 30 are in mesh with the gear workpiece W. In this case, in the gear machining apparatus 1, it is preferable to maintain a constant pressing force in terms of control or configuration.

Thus, in the eighth modification, the blade height of the first machining blades 11B, 21B, and 32 and the blade height of the second machining blades 12B, 22B, and 33 are made different from each other so that a necessary machining force can be applied to the gear workpiece W in accordance with the difference between the first machining and the second machining. That is, in the first machining and the second machining, the blade height of the machining blades that perform one of the first machining and the second machining in which a relatively large machining force is required is made higher than that of the machining blades that perform the other of the first machining and the second machining.

Figure 25:
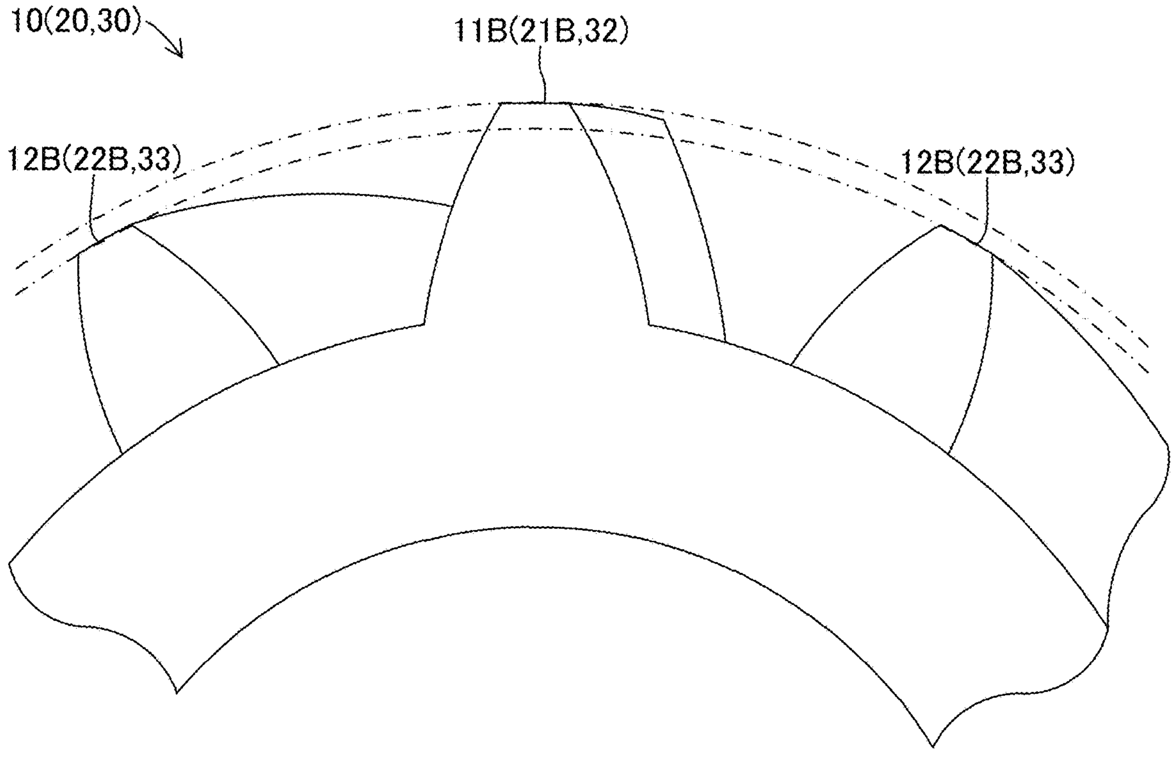
FIG. 25 is a view for explaining a difference in blade height between a first machining blade and a second machining blade according to an eighth modification.

Specifically, the phrasing machining requires a larger machining force in the workpiece radial direction than the relief machining and the shaving machining in which machining is performed along the tooth trace direction. Therefore, as illustrated in FIG. 25, the blade height of the first machining blades 11B, 21B, and 32 that perform the phrasing machining is higher than the blade height of the second machining blades 12B, 22B, and 33 that perform the relief machining or the shaving machining.

Accordingly, when the tools 10, 20, and 30 in the gear machining apparatus 1 are pressed against the gear workpiece W along the workpiece radial direction with a constant pressing force, the machining force of the phrasing machining by the first machining blades 11B, 21B, and 32 is relatively larger than the machining force of the relief machining or the shaving machining by the second machining blades 12B, 22B, and 33. Thus, the first machining blades 11B, 21B, and 32 reliably form the phrasing portions W2 on the workpiece teeth W1. Other effects are similar to those of the illustrated embodiment and the modifications described above.

12. Ninth Modification

In the illustrated embodiment and each of the modifications other than the second modification, the first tool members 11 and 21 and the second tool members 12 and 22 are coaxial with the rotation axis Ct, that is, the center axes of the first tool bodies 11A and 21A and the center axes of the second tool bodies 12A and 22A are coaxial with the rotation axis Ct.

As described in the eighth modification, the required machining force may be different between the first machining and the second machining. In this case, it is useful to vary the blade height of part of the plurality of first machining blades 11B and 21B formed along the outer circumferential surfaces of the first tool bodies 11A and 21A or the blade height of part of the plurality of second machining blades 12B and 22B formed along the outer circumferential surfaces of the second tool bodies 12A and 22A based on the required machining force.

Figure 26:
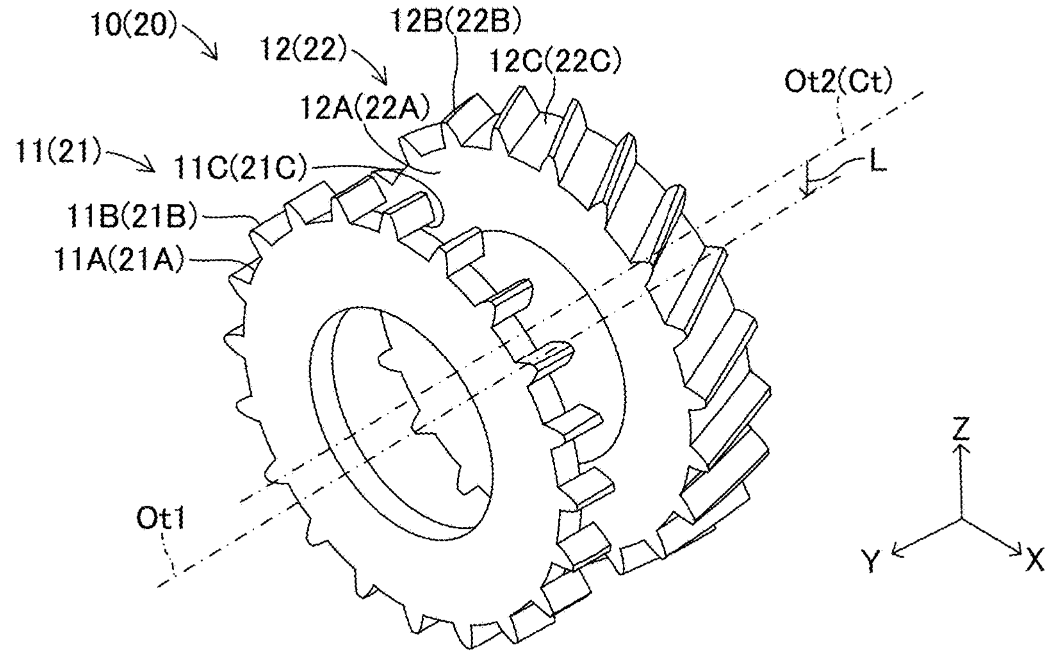
FIG. 26 is a view for explaining eccentricity of a first tool member and a second tool member according to a ninth modification.

In the ninth modification, as illustrated in FIG. 26, the center axis Ot1 of the first tool bodies 11A and 21A and the center axis Ot2 of the second tool bodies 12A and 22A are made eccentric. Specifically, the center axis Ot1 of the first tool bodies 11A and 21A and the center axis Ot2 of the second tool bodies 12A and 22A are made eccentric by a distance L. As described above, the required machining force is relatively larger in the phrasing machining than in the relief machining processing. In this case, therefore, the center axis Ot1 of the first tool bodies 11A and 21A is made eccentric in the Z-axis direction by the distance L with respect to the center axis Ot2 of the second tool bodies 12A and 22A.

In this case, the center axis Ot2 of the second tool bodies 12A and 22A coincides with the rotation axis Ct of the tools 10 and 20. That is, the center axis Ot1 of the first tool bodies 11A and 21A is eccentric by the distance L with respect to the rotation axis Ct. The center axis Ot2 of the second tool bodies 12A and 22A does not necessarily need to coincide with the rotation axis Ct of the tools 10 and 20.

Accordingly, when the tools 10 and 20 in the gear machining apparatus 1 are pressed against the gear workpiece W with a constant pressing force, the machining force of the phrasing machining by the first machining blades 11B and 21B is relatively larger than the machining force of the relief machining or the shaving machining by the second machining blades 12B and 22B every half rotation, that is, every half cycle. In this case, if the number of the first machining blades 11B and 21B and the number of the workpiece teeth W1 of the gear workpiece W are set to have a predetermined relationship, the first machining blades 11B and 21B can be brought into contact with all the workpiece teeth W1 by continuing the rotation of the tools 10 and 20. Thus, the first machining blades 11B and 21B can reliably form the phrasing portions W2 on the workpiece teeth W1. Other effects are similar to those of the illustrated embodiment and the modifications described above.

Here, in a case where the center axis Ot1 of the first tool bodies 11A, 21A is eccentric by the distance L with respect to the center axis Ot2 of the second tool bodies 12A, 22A, the diameter of the second tool bodies 12A, 22A may be smaller than the diameter of the first tool bodies 11A, 21A by a distance 2L. In other words, the outer diameter of the first tool bodies 11A and 21A is different from the outer diameter of the second tool bodies 12A and 22A, and the outer diameter of the first tool bodies 11A and 21A is larger than the outer diameter of the second tool bodies 12A and 22A.

In this configuration, when the center axis Ot1 of the first tool bodies 11A, 21A is made eccentric by the distance L in the radial direction with respect to the center axis Ot2 of the second tool bodies 12A, 22A, the protruding portions 11C, 21C of the first machining blades 11B, 21B present on the opposite side to the eccentric direction come into contact with the outer circumferential surface of the removed portions 12C, 22C of the second tool bodies 12A, 22A. This considerably simplifies a work of preparing for decentering the center axis Ot1 of the first tool bodies 11A and 21A. The first machining blades 11B and 21B located on the opposite side to the eccentric direction can also perform machining.

13. Tenth Modification

The illustrated embodiment and the modifications described above exemplify, as the second machining by the second machining blades 12B, 22B, and 33, the relief machining which is the rolling machining and the shaving machining which is the cutting machining. In particular, grinding can also be performed since the second machining blades 12B, 22B, and 33 perform machining while moving the machining point with respect to the workpiece teeth W1 in the second machining.

Figure 27:
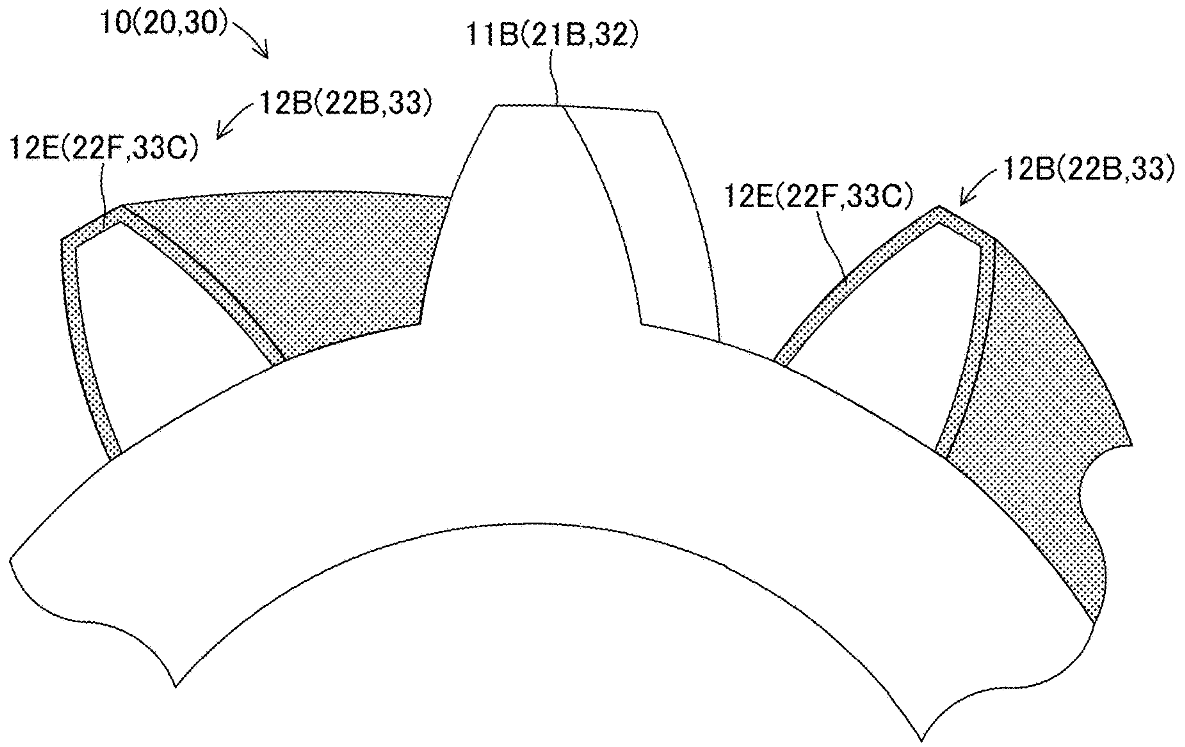
FIG. 27 is a view for explaining a coating layer according to a tenth modification.

The tenth modification exemplify, in particular, a case where the second machining blades 12B, 22B, and 33 have a coating layer containing abrasive grains and perform, on the workpiece teeth W1, the relief machining or the shaving machining by grinding. Specifically, as illustrated in FIG. 27, the surfaces of the second machining blades 12B, 22B, and 33 are respectively covered with coating layers 12E, 22F, and 33C containing abrasive grains.

In this configuration, the second machining blades 12B, 22B, and 33 and the gear workpiece W rotate relative to each other in a state in which the second machining blades 12B, 22B, and 33 and the gear workpiece W are in mesh with each other, so that the contact position between each coating layer 12E, 22F, and 33C and the tooth surface of the workpiece tooth W1, that is, the machining point, moves. As a result, the coating layers 12E, 22F, and 33C grind the tooth surface of the workpiece tooth W1. Thus, the coating layers 12E and 33C form the relief portions W3 on the tooth surface of the workpiece tooth W1 by grinding. The coating layer 22F grinds, together with the serration grooves 22D, irregularities on the tooth surface of the workpiece tooth W1 so as to remove the irregularities. Other effects are similar to those of the illustrated embodiment and the modifications described above.

The second machining blades 12B, 22B, and 33 respectively having the coating layers 12E, 22F, and 33C are useful for grinding, but the first machining blades 11B, 21B, and 32 that performs rolling may have the coating layers. In this case, since the coating layer containing the abrasive grains has high hardness, it is possible to suppress wear and abrasion of the first machining blades 11B, 21B, and 32 that performs the rolling.

14. Other Modifications

In the illustrated embodiment and the modifications other than the second modification, the number of the first machining blades 11B and 21B on the outer circumferential surfaces of the first tool bodies 11A and 21A is the same as the number of the second machining blades 12B and 22B on the outer circumferential surfaces of the second tool bodies 12A and 22A. Further, the formation pitch at which the first machining blades 11B and 21B are formed on the outer circumferential surfaces of the first tool bodies 11A and 21A and the formation pitch at which the second machining blades 12B and 22B are formed on the outer circumferential surfaces of the second tool bodies 12A and 22A are the same.

As described above, the removed portions 12C and 22C are provided on the outer circumferential surfaces of the second tool bodies 12A and 22A for allowing the protruding portions 11C and 21C of the first machining blades 11B and 21B to enter the removed portions 12C and 22C. Here, the removed portions 12C and 22C are provided by removing part of the second machining blades 12B and 22B formed on the outer circumferential surfaces of the second tool bodies 12A and 22A.

Instead, the number of the second machining blades 12B and 22B formed on the outer circumferential surfaces of the second tool bodies 12A and 22A may be smaller than the number of the first machining blades 11B and 21B formed on the outer circumferential surfaces of the first tool bodies 11A and 21A for allowing the protruding portions 11C and 21C of the first machining blades 11B and 21B to enter. In this case, the formation pitch at which the second machining blades 12B and 22B are formed on the outer circumferential surfaces of the second tool bodies 12A and 22A is preferably twice or more the formation pitch at which the first machining blades 11B and 21B are formed on the outer circumferential surfaces of the first tool bodies 11A and 21A.

In this configuration, since the number of the second machining blades 12B and 22B formed on the outer circumferential surfaces of the second tool bodies 12A and 22A is small, the interval of the second machining blades 12B and 22B, that is, the formation pitch, is widened. It is thus possible to ensure a space for allowing entry of the protruding portions 11C and 21C. In a case where the formation pitch of the second machining blades 12B and 22B is twice or more the formation pitch of the first machining blades 11B and 21B, in particular, the first machining blades 11B and 21B and the second machining blades 12B and 22B can be arranged at equal intervals in the circumferential direction in a state in which the protruding portions 11C and 21C enter, as in the illustrated embodiment, etc. Thus, it is not necessary to remove part of the second machining blades 12B and 22B formed on the outer circumferential surfaces of the second tool bodies 12A and 22A in order to provide the removed portions 12C and 22C.

The illustrated embodiment and the modifications described above exemplify the case where the first machining blades 11B, 21B, and 32 and the second machining blades 12B, 22B, and 33 in the tools 10, 20, and 30 are alternately arranged one by one. Instead, when the tool 10 is exemplified, the tool 10 may include a first machining blade group including a plurality ones of the first machining blades 11B continuously arranged along the outer circumferential surface of the first tool body 11A and a second machining blade group including at least one of the second machining blades 12B along the outer circumferential surface of the second tool body 12A. This configuration enables the first machining blades 11B, 21B and 32 and the second machining blades 12B, 22B to be freely arranged depending on the first machining and the second machining.

The illustrated embodiment and the modifications exemplify, as the second machining, the relief machining and the shaving machining. The second machining is not limited to the relief machining which is rolling or the shaving machining which is cutting. Various types of machining may be employed as long as the machining point is moved in machining. For example, tooth surface finishing can be exemplified. In this case, a finishing cutter may be employed as the second machining blade.

The illustrated embodiment and the modifications described above exemplify the case where, in the gear machining apparatus 1, the tool 10 (i.e., the tool spindle 6) is linearly movable toward the gear workpiece W in the Z-axis direction and the deburring roller 8 is linearly movable toward the gear workpiece W in the X-axis direction. Further, the illustrated embodiment and the modifications described above exemplify the case where, in the gear machining apparatus 1, the turning table 5 provided on the Z-axis moving table 4 rotates the tool spindle 6 about the C-axis with respect to the workpiece spindle 3.

However, the configuration of the gear machining apparatus 1 in which the gear workpiece W and the tool 10 are moved relative to each other may be suitably changeable. For example, in the gear machining apparatus 1, the tool 10 (i.e., the tool spindle 6) may be linearly movable toward the gear workpiece W in the X-axis direction, and the deburring roller 8 may be linearly movable toward the gear workpiece W in the Z-axis direction. For example, the gear machining apparatus 1 may be configured such that the gear workpiece W (i.e., the workpiece spindle 3) may be linearly movable toward the tool 10 (i.e., the tool spindle 6) in the Z-axis direction or the X-axis direction. The gear machining apparatus 1 may be configured such that the tool spindle 6 rotates around an A-axis, which is a rotation axis extending in the X-axis in the reference state, with respect to the workpiece spindle 3. The gear machining apparatus 1 may be configured such that the workpiece spindle 3 rotates about the C-axis or the A-axis with respect to the tool spindle 6.

In the gear machining apparatus 1 according to the illustrated embodiment and the modifications described above, the workpiece spindle 3 is a free rotation axis, and the tool spindle 6 is rotationally driven. Instead, in the gear machining apparatus 1, the workpiece spindle 3 may be rotationally driven, and the tool spindle 6 may be a free rotation axis.

Further, in the illustrated embodiment and the modifications described above, the phrasing machining, the relief machining, and the shaving machining are performed on the gear workpiece W of the external gear in which the workpiece teeth W1 are formed on the outer circumferential surface. In particular, the shaving machining may also be performed, by an internal gear shaving machining, on a gear workpiece of an internal gear in which workpiece teeth are formed on an inner circumferential surface.

Here, a tool according to a first form of the present invention is a tool having a plurality of machining blades and including: first machining blades formed on an outer circumferential surface of a disk-shaped tool body so as to be parallel to a rotation axis of the tool body, the first machining blades performing first machining on a workpiece; and second machining blades which are formed on the outer circumferential surface so as to be twisted with respect to the rotation axis and which have a blade length along a direction of the rotation axis longer than that of the first machining blades such that a machining point with respect to the workpiece is movable, the second machining blades performing second machining on the workpiece, wherein the first machining blades and the second machining blades are alternately arranged along the outer circumferential surface.

A tool according to a second form of the present invention is formed as follows. In the tool of the first form, the tool body is constituted by a first tool body having a disk shape and a second tool body having a disk shape, the tool includes: a first tool member having the first machining blades formed on an outer circumferential surface of the first tool body to perform the first machining on the workpiece; and a second tool member having the second machining blades formed on an outer circumferential surface of the second tool body to perform the second machining on the workpiece, and, in a state in which the first tool member and the second tool member are combined such that respective rotation axes of the first tool body and the second tool body are coaxial with each other, the machining blades of one of the first tool member and the second tool member are formed so as to protrude toward the other of the first tool member and the second tool member and the machining blades of the other of the first tool member and the second tool member are positioned at predetermined intervals in a circumferential direction relative to protruding portions of the machining blades of the one of the first tool member and the second tool member.

The tool of the second form of the present invention may be a tool having a plurality of machining blades and may include: a first tool member having first machining blades which are formed on an outer circumferential surface of a disk-shaped first tool body and which perform first machining on a workpiece; and a second tool member having second machining blades which are formed on an outer circumferential surface of a disk-shaped second tool body different from the first tool body and which perform second machining on the workpiece. In a state in which the first tool member and the second tool member are combined such that rotation axes of the first tool body and the second tool body are coaxial with each other, the machining blades of one of the first tool member and the second tool member may be formed so as to protrude toward the other of the first tool member and the second tool member, and the machining blades of the other of the first tool member and the second tool member may be formed so as to be positioned at predetermined intervals in a circumferential direction relative to protruding portions of the machining blades of the one of the first tool member and the second tool member.

A tool according to a third form of the present invention is formed as follows. In the tool according to the second form, at least part of the machining blades of the one of the first tool member and the second tool member has the protruding portions that protrude toward the other of the first tool member and the second tool member, the other of the first tool member and the second tool member has removed portions formed by removing at least part of the machining blades, and the protruding portions respectively enter the removed portions when the first tool member and the second tool member are combined.

A tool according to a fourth form of the present invention is formed as follows. In the tool according to the third form, a formation pitch at which the first machining blades are formed in the first tool member and a formation pitch at which the second machining blades are formed in the second tool member are identical with each other.

A tool according to a fifth form of the present invention is formed as follows. In the tool according to the second form, the number of the machining blades of the other of the first tool member and the second tool member is smaller than that of the one of the first tool member and the second tool member.

A tool according to a sixth form of the present invention is formed as follows. In the tool according to the fifth form, a formation pitch at which the machining blades are formed in the other of the first tool member and the second tool member is not less than twice a formation pitch at which the machining blades are formed in the one of the first tool member and the second tool member.

A tool according to a seventh form of the present invention is formed as follows. In the tool according to any one of the second form through the sixth form, a center axis of the one of the first tool member and the second tool member is eccentric with respect to a center axis of the other of the first tool member and the second tool member.

A tool according to an eighth form of the present invention is formed as follows. In the tool according to the seventh form, an outer diameter of the first tool body of the first tool member and an outer diameter of the second tool body of the second tool member are different from each other.

A tool according to a ninth form of the present invention is formed as follows. In the tool according to the eighth form, the outer diameter of the first tool body is greater than the outer diameter of the second tool body.

A tool according to a tenth form of the present invention is formed as follows. In the tool according to the any one of the first form through the ninth form, the first machining blades and the second machining blades have different blade heights each representing a height from a blade root to a blade tip.

A tool according to an eleventh form of the present invention is formed as follows. In the tool according to the tenth form, the blade height of one of the first machining blades and the second machining blades is greater than that of the other of the first machining blades and the second machining blades.

A tool according to a twelfth form of the present invention is formed as follows. In the tool according to the any one of the first form through the eleventh form, the workpiece is a workpiece gear, each of the first machining blades is a phrasing blade that performs, as first machining, phrasing machining to chamfer one end portion in a tooth trace direction of a tooth surface of the workpiece gear by meshing with the workpiece gear and pressing the one end portion, and each of the second machining blades is a relief blade that performs, as second machining, relief machining to remove a corner edge of one of four corner portions in the tooth trace direction of the tooth surface by moving the machining point with respect to the tooth surface of the workpiece gear while meshing with the workpiece gear and pressing the one of the four corner portions.

A tool according to a thirteenth form of the present invention is formed as follows. In the tool according to the any one of the first form through the twelfth form, the workpiece is a workpiece gear, each of the first machining blades is a phrasing blade that performs, as first machining, phrasing machining to chamfer one end portion in a tooth trace direction of a tooth surface of the workpiece gear by meshing with the workpiece gear and pressing the one end portion, and each of the second machining blades is a shaving blade that performs, as the second machining, shaving machining to remove irregularities of the tooth surface by moving the machining point with respect to the tooth surface while meshing with the workpiece gear and contacting the tooth surface.

A tool according to a fourteenth form of the present invention is formed as follows. In the tool according to any one of the first form through the thirteenth form, a surface of each of at least the second machining blades is covered with a coating layer containing abrasive grains.

A tool according to a fifteenth form of the present invention is formed as follows. In the tool according to any one of the first form through the fourteenth form, the tool includes: a first machining blade group including a plurality of ones of the first machining blades continuously arranged along the outer circumferential surface; and a second machining blade group including at least one of the second machining blades along the outer circumferential surface.

REFERENCE SIGNS LIST

1 . . . gear machining apparatus, 2 . . . base, 3 . . . workpiece spindle, 4 . . . . Z-axis moving table (moving device), 5 . . . turning table (moving device), 6 . . . tool spindle, 6A . . . spindle motor, 7 . . . . X-axis moving table, 8 . . . deburring roller, 8A . . . pair of rollers, 9 . . . controller, 10 . . . tool, 11 . . . first tool member, 11A . . . first tool body, 11B . . . first machining blade (phrasing blade), 11C . . . protrusion, 11D . . . chamfering portion, 11E . . . chamfering portion 12 . . . second tool member, 12A . . . second tool body, 12B . . . second machining blade (relief blade), 12C . . . removed portion, 12D . . . protruding portion, 12E . . . coating layer, 13 . . . spacer, 14 . . . phrasing cutter, 14A . . . chamfering portions, 14B . . . chamfering portions, 20 . . . tool, 21 . . . first tool member, 21A . . . first tool body, 21B . . . first machining blade (phrasing blade), 21C . . . protruding portion, 21D . . . chamfering portion, 21E . . . chamfering portion, 22 . . . second tool member, 22A . . . second tool body, 22B . . . second machining blade (shaving blade), 22C . . . removed portion, 22D . . . serration groove, 22E . . . protruding portion, 22F . . . coating layer, 23 . . . spacer, 24 . . . phrasing cutter, 24A . . . chamfering portion, 24B . . . chamfering portion, 30 . . . tool, 31 . . . tool body, 32 . . . first machining blade (phrasing blade), 32A . . . chamfering portion, 32B . . . chamfering portion, 33 . . . second machining blade (relief blade, shaving blade), 34 . . . spacer, 35 . . . phrasing cutter, 35A . . . chamfering portion, 35B . . . chamfering portion, W . . . gear workpiece (workpiece gear (workpiece)), W1 . . . workpiece tooth, W2 . . . phrasing portion (end portion), W3 . . . relief portion (corner portion), Ct, Cw, Cr . . . rotation axis, Ot1, Ot2 . . . center axis, T1, T2, T3, T4, T5, T6 . . . tool unit

The invention claimed is:

1. A tool comprising:

a first tool member including first machining blades formed on an outer circumferential surface of a disk-shaped first tool body so as to be parallel to a rotation axis of the first tool body, the first machining blades performing first machining on a workpiece; and a second tool member including second machining blades which are formed on an outer circumferential surface of a disk-shaped second tool body so as to be twisted with respect to a rotation axis of the second tool body and which have a blade length along a direction of the rotation axis of the second tool body longer than that of the first machining blades, the second machining blades performing second machining on the workpiece, wherein, in a state in which the first tool member and the second tool member are combined such that the respective rotation axes of the first tool body and the second tool body are coaxial with each other, the machining blades of the first tool member are formed so as to protrude in the direction of the rotation axes from the first tool body toward the second tool member, and the machining blades of the second tool member are positioned at predetermined intervals in a circumferential direction relative to protruding portions of the machining blades of the first tool member.

2. The tool according to claim 1, wherein the first machining blades and the second machining blades are alternately arranged along an outer circumferential surface of the tool in a state in which the first tool member and the second tool member are combined.

3. The tool according to claim 1, wherein at least part of the machining blades of the first tool member has the protruding portions that protrude toward the second tool member, wherein the second tool member has circumferential gaps between adjacent ones of the second machining blades, and wherein the protruding portions respectively enter the circumferential gaps in a state in which the first tool member and the second tool member are combined.

4. The tool according to claim 3, wherein a formation circumferential pitch at which the first machining blades are formed in the first tool member and a formation circumferential pitch at which the second machining blades are formed in the second tool member are identical with each other.

5. The tool according to claim 1, wherein the number of the second machining blades of the second tool member is smaller than the number of the first tool blades of the first tool member.

6. The tool according to claim 5, wherein a circumferential formation pitch at which the second machining blades are formed in the second tool member is not less than twice a circumferential formation pitch at which the first machining blades are formed in the first tool member.

7. The tool according to claim 1, wherein a center axis of one of the first tool member and the second tool member is eccentric with respect to a center axis of the other of the first tool member and the second tool member.

8. The tool according to claim 7, wherein an outer diameter of the first tool body of the first tool member and an outer diameter of the second tool body of the second tool member are different from each other.

9. The tool according to claim 8, wherein the outer diameter of the first tool body is greater than the outer diameter of the second tool body.

10. The tool according to claim 1, wherein the first machining blades and the second machining blades have different blade heights each representing a height from a blade root to a blade tip.

11. The tool according to claim 10, wherein the blade height of the first machining blades is greater than that of the second machining blades.

12. The tool according to claim 1, wherein the workpiece is a workpiece gear, wherein each of the first machining blades is a phrasing blade that performs, as the first machining, phrasing machining to chamfer one end portion in a tooth trace direction of a tooth surface of the workpiece gear by meshing with the workpiece gear and pressing the one end portion, and wherein each of the second machining blades is a relief blade that performs, as the second machining, relief machining to remove a corner edge of one of four corner portions in the tooth trace direction of the tooth surface while meshing with the workpiece gear and pressing the one of the four corner portions.

13. The tool according to claim 1, wherein the workpiece is a workpiece gear, wherein each of the first machining blades is a phrasing blade that performs, as the first machining, phrasing machining to chamfer one end portion in a tooth trace direction of a tooth surface of the workpiece gear by meshing with the workpiece gear and pressing the one end portion, and wherein each of the second machining blades is a shaving blade that performs, as the second machining, shaving machining to remove irregularities of the tooth surface while meshing with the workpiece gear and contacting the tooth surface.

14. The tool according to claim 1, wherein a surface of each of at least the second machining blades is covered with a coating layer containing abrasive grains.

15. The tool according to claim 1, comprising:

a first machining blade group including a plurality of ones of the first machining blades continuously arranged along the outer circumferential surface of the first tool body; and a second machining blade group including a plurality of ones of the second machining blades continuously arranged along the outer circumferential surface of the second tool body, wherein the first machining blade group and the second machining blade group are alternately arranged along an outer circumferential surface of the tool in a state in which the first tool member and the second tool member are combined.

16. The tool according to claim 1, wherein a first machining blade group including a plurality of ones of the first machining blades continuously arranged along the outer circumferential surface of the first tool body and one of the second machining blades are alternately arranged along an outer circumferential surface of the tool in a state in which the first tool member and the second tool member are combined.

17. The tool according to claim 1, wherein one of the first machining blades and a second machining blade group including a plurality of ones of the second machining blades continuously arranged along the outer circumferential surface of the second tool body are alternately arranged along an outer circumferential surface of the tool in a state in which the first tool member and the second tool member are combined.

18. A gear machining apparatus, comprising:

the tool according to claim 1;

a tool spindle configured to rotationally drive the tool;

a workpiece spindle configured to rotationally drive a workpiece gear as the workpiece; and a moving device configured to move the workpiece spindle and the tool spindle relative to each other so as to enable the tool supported by the tool spindle and the workpiece gear supported by the workpiece spindle to be in mesh with each other, wherein the first machining and the second machining are repeatedly performed in one machining process.

19. The gear machining apparatus according to claim 18, wherein a surface of each of the second machining blades that perform the second machining is covered with a coating layer containing abrasive grains, and the second machining blades grind tooth surfaces of the workpiece gear.

20. A method of machining a gear, using:

the tool according to claim 1;

a tool spindle configured to rotationally drive the tool;

a workpiece spindle configured to rotationally drive a workpiece gear as the workpiece; and a moving device configured to move the workpiece spindle and the tool spindle relative to each other so as to enable the tool supported by the tool spindle and the workpiece gear supported by the workpiece spindle to be in mesh with each other, wherein the method comprises continuously and repeatedly performing, in one machining process, the first machining and the second machining in order by performing the second machining following the first machining and performing the first machining following the second machining.

21. The method according to claim 20, wherein a surface of each of the second machining blades that perform the second machining is covered with a coating layer containing abrasive grains, and the second machining blades grind tooth surfaces of the workpiece gear.

* * * * *